United States Patent
Chaudhry et al.

(10) Patent No.: US 8,612,598 B1
(45) Date of Patent: Dec. 17, 2013

(54) METHOD AND SYSTEM FOR INGESTING CONTENT SCHEDULE DATA FROM AN EXTERNAL SOURCE

(75) Inventors: Kapil Chaudhry, Cerritos, CA (US); David N. Schlacht, Los Angeles, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 95 days.

(21) Appl. No.: 13/031,113

(22) Filed: Feb. 18, 2011

(51) Int. Cl.
*G06F 15/173* (2006.01)

(52) U.S. Cl.
USPC ........... 709/226; 709/212; 709/217; 709/220; 709/230; 709/246; 709/248; 709/249

(58) Field of Classification Search
USPC ......... 709/203, 212, 217, 220, 225, 226, 229, 709/230, 246, 249
See application file for complete search history.

(56) References Cited

U.S. PATENT DOCUMENTS

| | | | |
|---|---|---|---|
| 6,311,214 B1* | 10/2001 | Rhoads | 709/217 |
| 6,330,598 B1* | 12/2001 | Beckwith et al. | 709/223 |
| 6,353,929 B1* | 3/2002 | Houston | 725/20 |
| 6,446,113 B1* | 9/2002 | Ozzie et al. | 709/204 |
| 6,728,713 B1* | 4/2004 | Beach et al. | 1/1 |
| 6,742,043 B1* | 5/2004 | Moussa et al. | 709/232 |
| 7,409,546 B2* | 8/2008 | Platt | 713/165 |
| 7,584,192 B2* | 9/2009 | Rey et al. | 1/1 |
| 7,631,323 B1* | 12/2009 | Green et al. | 725/5 |
| 7,702,739 B1* | 4/2010 | Cheng et al. | 709/207 |
| 7,877,768 B2* | 1/2011 | Beach et al. | 725/37 |
| 7,900,231 B2* | 3/2011 | Paxton et al. | 725/93 |
| 7,933,950 B1* | 4/2011 | Barton et al. | 709/203 |
| 8,010,692 B1* | 8/2011 | Shanson et al. | 709/231 |
| 8,181,194 B2* | 5/2012 | Houston | 725/14 |
| 8,266,646 B2* | 9/2012 | Houston | 725/20 |
| 2001/0054064 A1* | 12/2001 | Kannan | 709/203 |
| 2002/0006116 A1 | 1/2002 | Burkhart | |
| 2002/0118954 A1* | 8/2002 | Barton et al. | 386/83 |
| 2004/0158870 A1* | 8/2004 | Paxton et al. | 725/115 |
| 2006/0268917 A1 | 11/2006 | Nadarajah | |
| 2007/0150595 A1* | 6/2007 | Bhorania et al. | 709/226 |
| 2008/0201461 A1 | 8/2008 | Yoshiuchi | |
| 2009/0165088 A1 | 6/2009 | Chaudhry | |
| 2009/0271813 A1 | 10/2009 | Russ et al. | |
| 2010/0205275 A1* | 8/2010 | Yu | 709/217 |
| 2010/0332818 A1* | 12/2010 | Prahlad et al. | 713/150 |
| 2011/0022641 A1* | 1/2011 | Werth et al. | 707/803 |
| 2012/0239824 A1* | 9/2012 | Nguyen et al. | 709/246 |

* cited by examiner

*Primary Examiner* — Michael Won

(57) ABSTRACT

A content ingestion system and method of operating the same includes a client module receiving a schedule data signal from an external service provider to a content ingestion module. The system also includes a first queue receiving the schedule data signal from the client module. The system further includes a switch module forming a plurality of objects from the schedule data signal and a second queue receiving the plurality of objects from the first switch module. A persistence module is also included in the system that reads the objects from the second queue and storing the objects in a database.

35 Claims, 22 Drawing Sheets

US 8,612,598 B1

METHOD AND SYSTEM FOR INGESTING CONTENT SCHEDULE DATA FROM AN EXTERNAL SOURCE

TECHNICAL FIELD

The present disclosure relates generally to communication systems for communicating data to a user device, and more particularly, to a method and system for receiving data from an external source and communicating data to a user device.

BACKGROUND

The statements in this section merely provide background information related to the present disclosure and may not constitute prior art.

Communication systems such as pay or subscription communication systems include a primary service provider and a user receiver device such as a set top box or integrated receiver decoder. The user device is typically provided with authorization to communicate with the primary service provider and receive services therefrom. One example of such a system is a satellite television system such as DIRECTV®. Conditional access is provided at the user device in the faun of a card that allows the user device to receive and process signals from the primary service provider.

Providing secure access to data is important for a primary service provider. At certain time such as an Olympic event, networks may share coverage with other networks or service providers. Providing access to the content to customers of another service provider is desirable. Accessibility for the content is also important. An example of a type of data that may be provided includes program guide data and other types of data such as metadata associated with the guide data. Security is important for the content and to prevent others from accessing the content is important.

SUMMARY

The present disclosure provides a system and method for ingesting schedule data for content from an external source.

In one aspect of the invention, a method includes communicating schedule data signal from an external service provider to a content ingestion module, communicating the schedule data signal to a first queue, forming a plurality of objects from the schedule data signal, communicating the plurality of object to a second queue, reading the objects from the second queue and storing the objects in a database.

In another aspect of the invention, a content ingestion system includes a client module receiving a schedule data signal from an external service provider to a content ingestion module. The system also includes a first queue receiving the schedule data signal from the client module. the system further includes a switch module forming a plurality of objects from the schedule data signal and a second queue receiving the plurality of objects from the first switch module. A persistence module is also included in the system that reads the objects from the second queue and storing the objects in a database.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
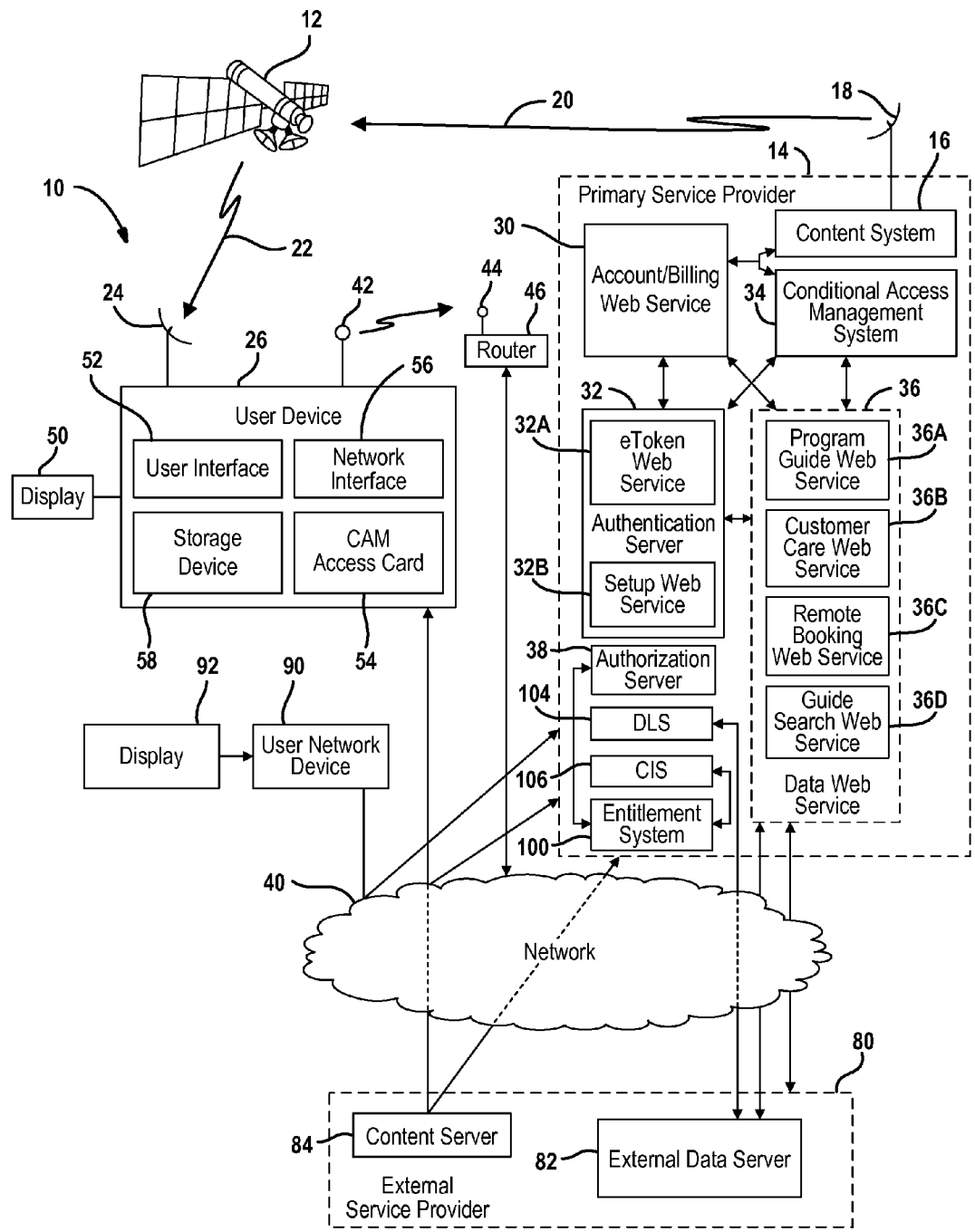
FIG. 1 is a block diagrammatic view of a first embodiment of a satellite communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title or program will be used to refer to, for example, a media content type such as a movie itself and not the name of the movie.

The word, service, is used to convey hardware, software or a combination thereof. The service may be implemented in a computer file server or web server. Servers may be standalone or combined to have various functions. The servers may be physically located in one location or multiple locations. More than one actual server device may perform a particular function. When more than one server is used, they may be distributed geographically. Servers have an associated memory in which data is stored. Servers provide different functions to prevent overloading and maintain service speed. The servers may have "containers" therein that provide the unique environment. The containers may be used interchangeably with web server herein. The containers execute the process in the web server.

The following system is designed to ingest schedule data from an external service provider. The schedule data may include various data associated or relevant to the content that is or will be provided from the external service provider. Examples include but are not limited to identifiers which are numeric or alphanumeric identifiers for the content, network, channel and third-party identifier. Other data may include but are not limited to the title, a description, start time, end time, publish date, end publish date, category, maturity rating, actor and series.

Referring now to FIG. 1, a satellite television broadcast system 10 is illustrated. The satellite television broadcast system 10 is illustrated by way of example. However, the present disclosure is not so limited hereto as mentioned above. The television broadcast system 10 includes a satellite 12 that receives content or programming from a primary service provider 14. More specifically, the primary service provider 14 includes a content system 16 that generates uplink signals 20 corresponding to content through an uplink antenna 18. The content system 16 may have content stored therein or pass content therethrough as in live television broadcasting. Thus, the content system 16 may provide both stored content and live content to user devices. The content may be communicated through a terrestrial or extraterrestrial source. The primary service provider 14 may provide the final link to a user device 26 that is associated with the primary service provider (e.g. a subscriber).

The uplink signals 20 may be content signals or television signals and more specifically digital content or television signals. The uplink antenna 18 communicates the uplink signals 20 to the satellite 12 which in turn generates downlink signals 22. The downlink signals 22 are communicated to a receiving antenna 24 at the user device 26. Although only one user device 26 is illustrated, several user devices may be provided in the system 10. The uplink signals 20 and downlink signals 22 may be referred to as communication signals. Communication signals are wireless communication signals and may include various types of entertainment content, traffic, weather, hazardous material warnings, advertising material, and the like. As mentioned above, this system may be suitable for wired systems such as cable televisions and terrestrial wireless systems.

The user device 26 may include a satellite television receiver, set top box or a digital video recorder. The satellite television receiver may also be referred to as an integrated receiver decoder. Of course, other types of user devices 26 may be used such as a cable television set top box. Other types of user devices 26 may include a mobile device such as a lap top computer, cellular phone, personal digital assistant, a portable media player or an automotive-based television receiving device. Thus, the user device 26 may be a fixed user device in the case of a satellite television set top box or a mobile user device. Both fixed and mobile devices may be used in a system.

The primary service provider 14 may also include an account/billing web service 30 and an authentication server 32. The authentication server 32 may include an encrypted token (eToken) web service 32A and a setup web service 32B. The eToken web service 32A may be used to generate and validate eTokens. The generation and validation process will be further described below. The setup web service 32B may be used to setup or establish information so that an eToken may be generated. The set-up process will be described further below.

The primary service provider 14 may also include a conditional access management system 34. The conditional access management system 34 may be used to grant conditional access to various programming as well as provide recording commands to the user device 26 as will be described below.

The primary service provider 14 may also include a data web service 36. The data web service 36 may include a programming guide web service 36A, a customer care web service 36B and a remote booking web service 36C.

The program guide web service 36A may be used to generate program guide data and information regarding various programming that is available. The program guide web service 36A, as will be described below, may generate custom programming guide information based upon the subscription to which a user is subscribed. The program guide web service 36A may also provide generic or non-customized content when specific user attributes are not known. When user attributes such as location and subscription information are known, only the content available to the particular subscriber may be included in the program guide. Additional content may be provided for advertising purposes. Thus, channel data for particular channels may be provided in the program guide. Content available from an external service provider (80 described below) may also be included in the program guide data. This will be described below.

The program guide web service 36A may generate program guide data for both linear and non-linear content. Linear content are television shows broadcasted at a particular time and a particular channel. Network television programming is an example. Non-linear content is programming that is not tied to a particular time such as on-demand content that can be requested at the user's discretion.

The customer care web service 36B may be used to generate and provide users with various types of help mechanisms to resolve technical issues.

The remote booking web service 36C may be used to generate remote booking commands or recording instructions as will be described below. The remote booking commands or recording instructions may be transmitted through the uplink antenna 18 to the satellite 12 and downlinked through the downlink signal 22 to an antenna 24 on the user device 26. A remote booking command may then initiate the user device 26 to store content broadcast by the satellite 12 thereon.

A guide search web service 36D may be used to provide searching capabilities to customers of the partner service provider. The searching may take place using stored data within the DIRECTV® listing service 104. The searching as described below may be for linear content, non-linear content or a combination of linear and non-linear content. Both types of content could be made available to customers of the primary service provider to search. Customers of the partner service provider and not of the primary service provider may also be provided with access to linear content and potentially non-linear. This may allow potential primary service provider customers to see the wide variety of choices provided by the primary service provider. Non-customers of the provider system may be referred to as a generic user. Generic users may thus be provided with search results from national channels and local channels, if location information is provided.

The primary service provider 14 may also include an authorization server 38. The authorization server 38 may provide authorizations to users and prevent users from having too many simultaneous streams. The authorization server may also be used to prevent access to content that a user has not subscribed to.

The user device 26 is in communication with the primary service provider 14 through a network 40. The network 40 may be a secured network or use a secure protocol. The network 40 may include a broadband network through which the user device 26 communicates with the primary service provider 14. The network 40 may be a wired network such as a public-switched telephone network (PSTN) or a broadband Internet network. The network may be wireless such as a cellular or wireless Internet system. The broadband network may communicate wired, wirelessly or a combination of both. For example, the user device 26 may include a wireless antenna 42 for communicating with an antenna 44 of a router 46 which, in turn, is in communication with the network 40.

The network 40 may also be an intranet. The components of both the primary and partner service provider may be located separately or in the same building.

The user device 26 may be associated with a display 50 for displaying content and programming, as well as displaying various types of user commands, or the like. The display 50 may be a television or display integrated into the device. The display 50 may include speakers for an audio display. The display 50 may be used for displaying primary content from a primary service provider and secondary content from a secondary service provider.

The user device 26 may include a user interface 52, such as a keyboard, remote control, or the like, for selecting and entering various types of information by the user. The user device 26 may also include a conditional access module 54 that allows the user to access the programming provided from the content system 16. The conditional access module 54 may be referred to as an access card. The conditional access module 54 may include various activation codes without which the user device is not activated. The conditional access module 54 may include a conditional access module identifier such as a number or a code.

The user device 26 may also include a network interface 56 for interfacing with the network 40. For example, the network interface 56 may communicate wirelessly through the antenna 42 or through a direct connection such as an Ethernet connection. The network interface 56 may be but is not limited to a wireless broadband interface, a broadband interface, a modem-type interface or a public-switched telephone network interface.

The user device 26 may also include a storage device 58. The storage device 58 may store various content received from the primary service provider therein. The content may be received through the satellite 12 or through the network 40 through the network interface 56. The storage device 58 may be a hard disk drive or memory chip-based device. The storage device 58 may be referred to as a digital video recorder.

The primary service provider 14 may be in communication with an external service provider 80. The external service provider 80 may include an external data sever 82 and an external content server 84. The external data server 82 may provide the program guide web service with program guide data, a product data, graphics data and data about specific actions, celebrities, producers, and the like. Metadata may also be provided by the external service provider 80. The metadata may include various descriptions, network or channel affiliations and the like. One example of an external data that may be provided is the Tribune Media Service® (TMS) identifier. TMS is a commercial service that provides various product content data such as metadata (titles, identifiers, descriptions) and schedules to service providers. Other data providers may be used. The external service provider 80 may provide unique identifiers for each piece of content. The data provided by the external service provider 80 may include movie data, graphics types, TV show data, celebrity data, TV show cards, and other data. Data may also be provided for upcoming movies, shows and other events. The external data provider 80 may include a file transfer protocol server 82 for transferring files in a desired format.

The content server 84 may provide content to the primary service provider 14. The content may be various types of content including promotional content which is relatively short in nature and full-length movies. Other types of content may be provided such as television programming, sports clips and highlights and commercial material. The content server 84 may be in communication with the primary service provider 14 through the network 40. The content server 84 may also be in communication with the user device 26 through the network 40. In one embodiment of the disclosure, the primary service provider may provide data with respect to content that is available to the user device 26. After the user device 26 is authorized, the external service provider may also provide the content directly to the user device 26. The primary service provider 14 may also provide the content from the content server 84 as a pass-through to the user device 26 from the external service provider.

The system 10 may also include a user network device 90 that includes a display 92. The display 92 may be separate or integrated into the user network device 90. The user network device 90 may be a web browsing device such as a portable computer, a personal digital assistant, a portable video player, an automotive-based user device, or the like. For certain aspects of the disclosure, the set top box or user device 26 may be considered a user network device since browsing and obtain content and schedules may be performed therefrom.

The user network device 90 may receive various data from the servers within the primary service provider 14. The display 92 may be used for displaying various program guide information, along with other information provided by the partner service provider. The other information may include financial information, weather information, voicemail information, or other types of information. The primary service provider 14 may provide the content to be displayed on a website in various manners together with or in addition to the program guide information or other information.

The primary service provider 14 may also include a television listing server (DLS) database 104. The television listing server database 104 may include data corresponding to various listings for various program times and schedules. The television listing server database 104 may be in communication with the external data provider 80.

A content ingestion system 106 may also be provided within the primary service provider 14. The content ingestion system 106 is used to ingest the partner schedule into the primary service provider data system. The data is used to authorize users of the primary service provider to access the content as well as provide access to the underlying data. The ingestion process will be described below.

The primary service provider 14 may also include an entitlement system 100. The entitlement system 100 may be used to determine the entitlement of the user device 26. That is, the user device 26 may be entitled to or subscribed to various contents and various channels. Authorization from the content available from the external service provider may be limited to content that has been subscribed to. The entitlement system 100 will be further described below.

Figure 2:
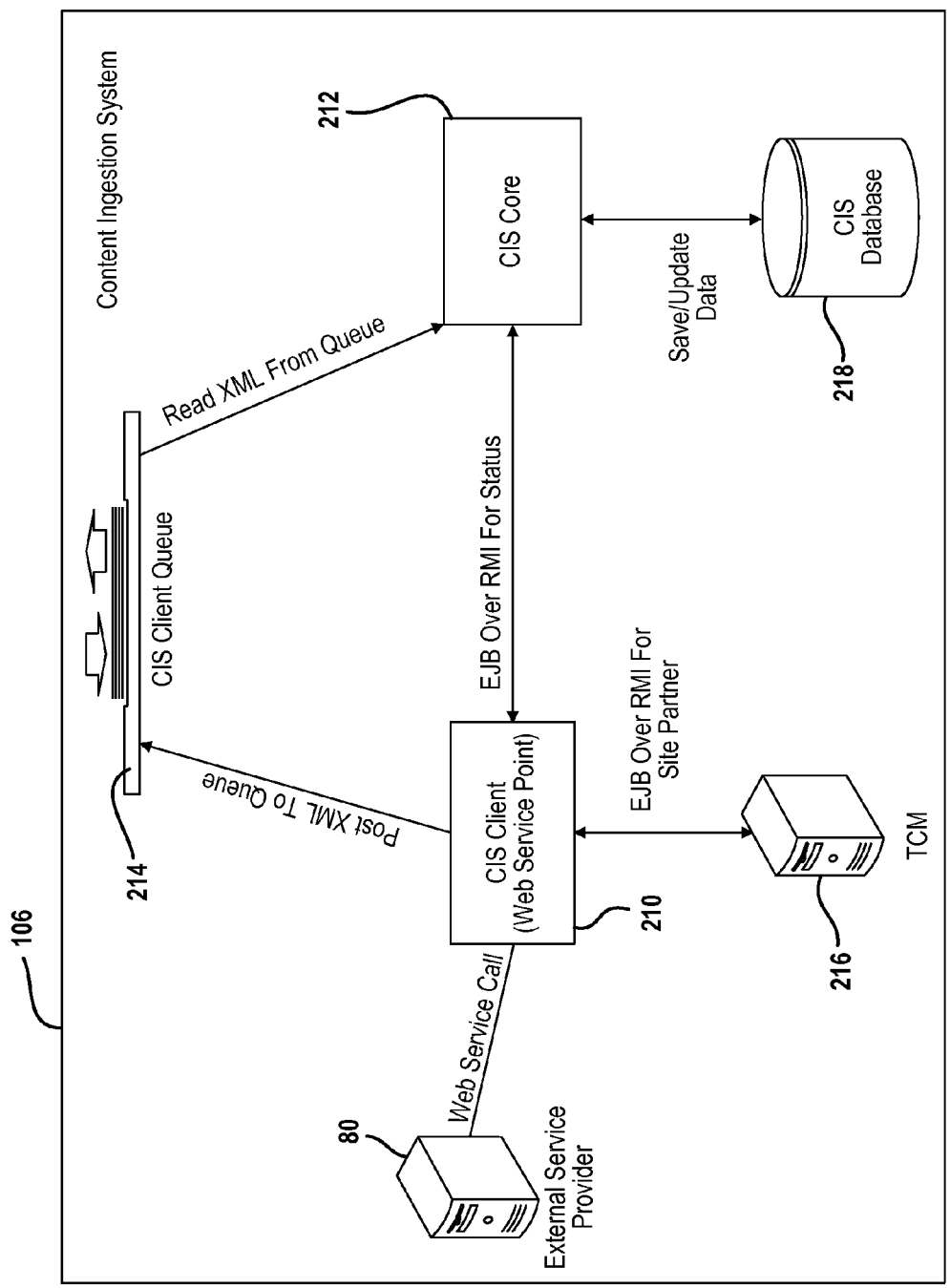
FIG. 2 is a block diagrammatic view of a content ingestion system according to the present disclosure.

Referring now to FIG. 2, the content ingestion system 106 may include a content ingestion system (CIS) client 210, a CIS core 212, a CIS client queue 214, a token control management (TCM) system 216 and a database 218.

The CIS client 210 may be a simple web service end point. The CIS client 210 accepts schedule data in a predetermined format such as XML format and may determine a status on the processing of schedule data. The CIS client 210 receives schedule data and may also validate the identity of the service provider using digital signals provided from the external service provider 80. The token control management system 216 may keep track of the various tokens such as electronic tokens or eTokens that are authorized for various external service providers. After validating the token, the schedule data may be communicated to the CIS client queue 214. When the CIS client 210 rejects the schedule data from the external service provider 80, a simple object access protocol (SOAP) signal is generated to indicate a client fault.

The CIS client 210 may also provide another web service as to the status of the data ingestion.

The CIS core 212 may save and update data in the database 218. Detailed operation of the CIS client 210 and the CIS core 212 is provided below.

Figure 3:
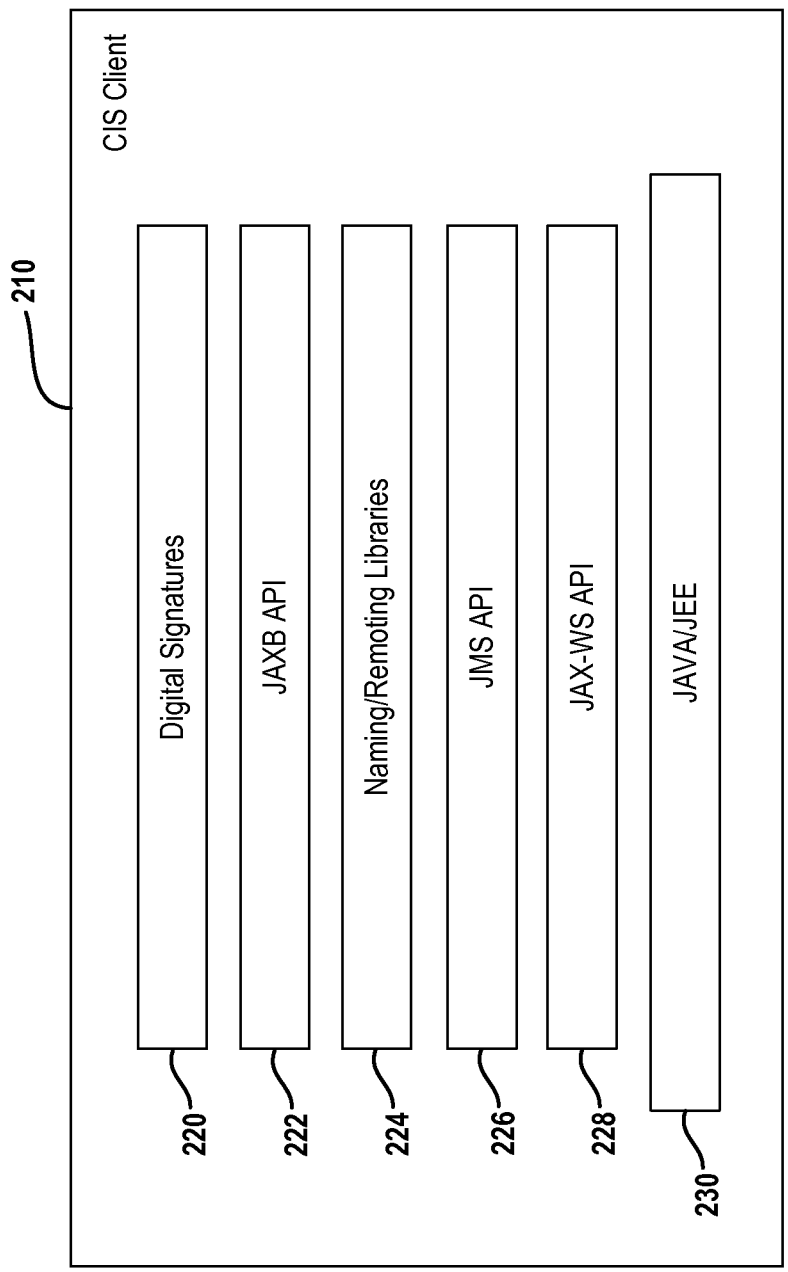
FIG. 3 is a block diagrammatic view of the content ingestion system client of FIG. 3.

Referring now to FIG. 3, the CIS client 210 may be implemented using an Apache Tomcat open source Java servlet and Java server page technology. Of course, other types of Java implementations, as well as other non-Java implementations, may be used. The CIS client 210 may include a digital signatures module 220 that is used to verify the digital signatures from the external service provider 80. A Java arch for XML binding (JAXB) application programming interface (API) 222 may also be included within the CIS client 210.

A naming/remoting library module 224 may also be within the CIS client 210. A Java messaging service application interface 226 may also be included within the CIS client 210. A Java application interface for XML web service (JAX-WS) may also be included within the CIS client 210. A Java or Java enterprise (JEE) module 230 may also be included within the CIS client 210.

Figure 4:
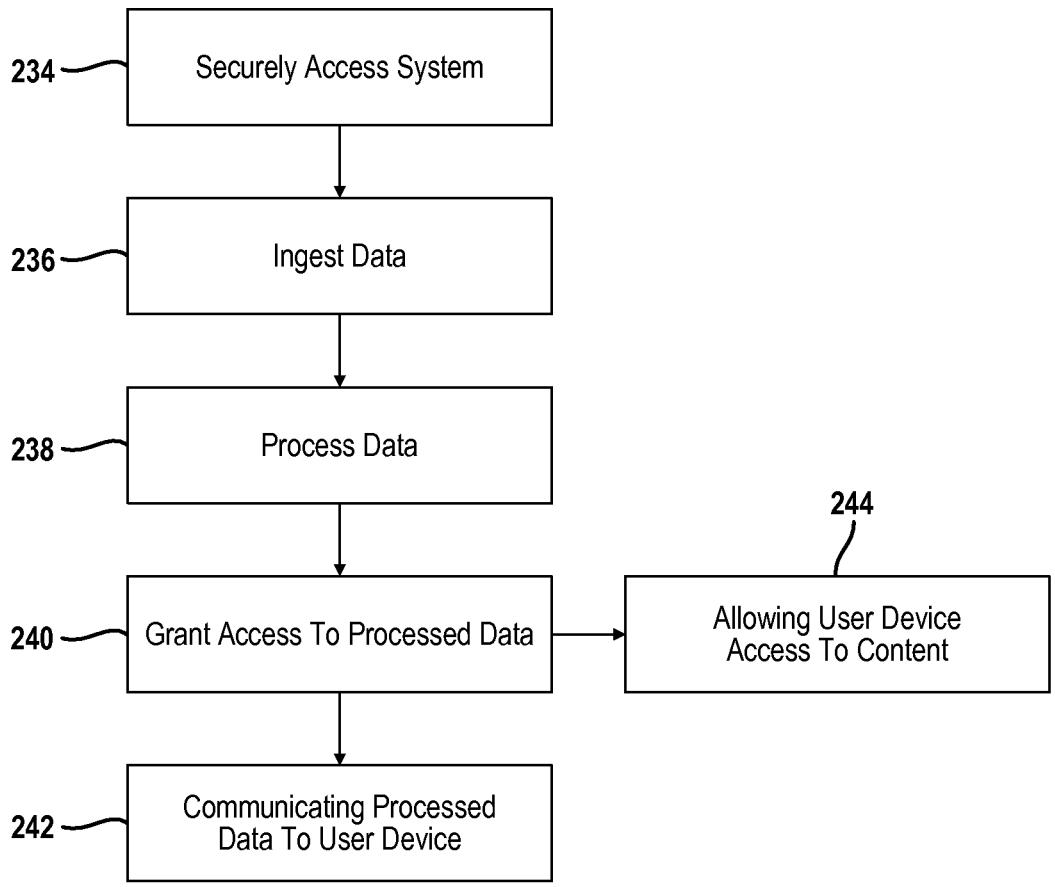
FIG. 4 is a flowchart of a high level method of operating the system according to the present disclosure.

Referring now to FIG. 4, a general method for operating the content ingestion system is set forth. In step 234, the system is securely accessed by an external service provider. That is, the external service provider may be authorized as well as the content of the communication authorized or verified before the content ingestion system will save the content therein.

In step 236, once the communication between the content ingestion system and the external service provider is secure, the data may be ingested into the system. In step 238, the data may be processed. As will be described below, the data may be processed into sub-portions or objects of the original data. This has the advantage of reducing processing time if there is an error in ingesting an object. The system only has to restart the processing of the object rather than the entire file.

In step 240, access may be granted to the process data from user devices. In step 242, once access is granted to the process data, the process data may be communicated to a user device in step 242.

Once access is granted to the process data, the user device may have access to the content in step 244.

Figure 5:
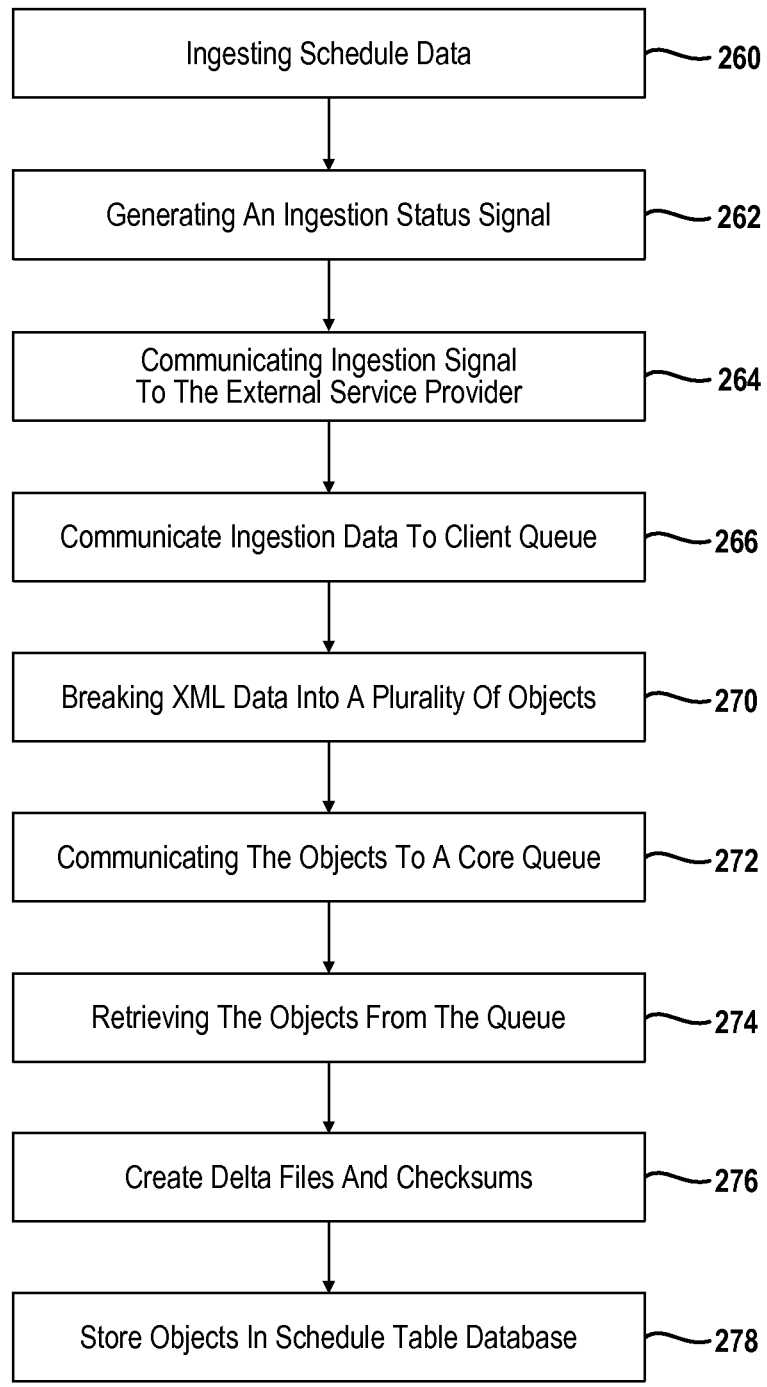
FIG. 5 is a flowchart of a method for operating the content ingestion system according to the present disclosure.

Referring now to FIG. 5, a block diagram of the general flow of the method of operating the content ingestion system (CIS) is set forth. In step 260, the content ingestion system ingests schedule data from the external service provider. In step 262, an ingestion status signal may be communicated from the primary service provider 14 to the external service provider 80 illustrated in FIG. 1. In step 262, the ingestion signal may be communicated to the external service provider. In step 266, the ingestion data is communicated to the client queue.

In step 270, the CIS core 212 illustrated in FIG. 2 breaks the XML data into a plurality of objects. In step 272, the objects are communicated to a core queue. In step 274, the objects are retrieved from the queue. In step 276, delta files and check sums may be generated from the objects formed in step 270. In step 278, the objects are stored within a schedule table database such as the CIS database 218 illustrated in FIG. 2.

Figure 6:
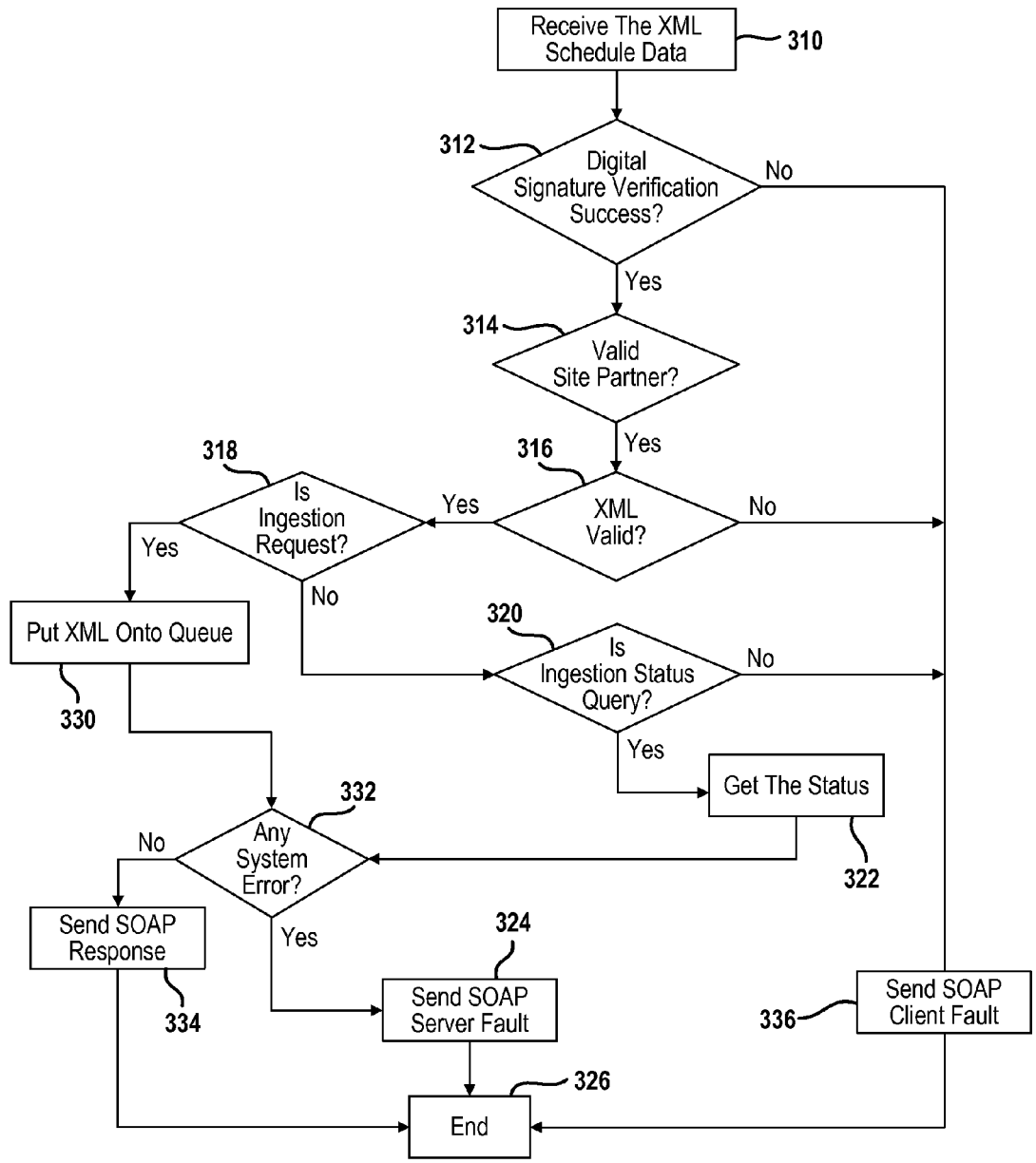
FIG. 6 is a flowchart of a method for ingestion of schedule data.

Referring now to FIG. 6, a detailed method for ingesting schedule data is set forth. In step 310, schedule data, such as schedule data in an XML format, is received by the CIS client from the external service provider 80 illustrated in FIG. 2. The XML schedule data received in step 310 may also include a digital signature. A partner public certificate may be stored within the client 210 that corresponds to the private key used to sign the message. If the digital signature is verified in step 312, step 314 validates the partner account. A partner account number may also be communicated in step 312. Step 314 checks the partner account to determine if there is an existing account for the partner that is active and specific.

In step 316, the received schedule data is compared to a specific scheme to determine if it is valid. If the XML data is valid, step 318 is determined if there is an ingestion request. If there is no ingestion request in step 318, step 320 determines if the request is an ingestion status query. If the query is an ingestion status query, the status is obtained in step 322. After step 322, if there is no status, step 324 sends a SOAP signal as a server fault in step 324. After step 324, step 326 is performed which ends the process.

Referring back to step 318, if the request is an ingestion request, step 330 is performed. In step 330, the XML is communicated into a queue. After step 330, step 332 is performed which determines if there are any system errors. Step 332 is performed also after 322 if the status is obtained. If there are system errors in step 332, step 324 sends a SOAP server fault message as described above.

In step 332, if no system errors are found, a SOAP response is generated in step 334.

In step 312, if the digital signature is not verified, or in step 314 if the type partner is not valid, or in step 316 if the XML is not valid, or in step 320 if the ingestion status is not valid, step 336 sends a SOAP client fault message indicating that there is a fault with the message from the external service provider.

Figure 7:
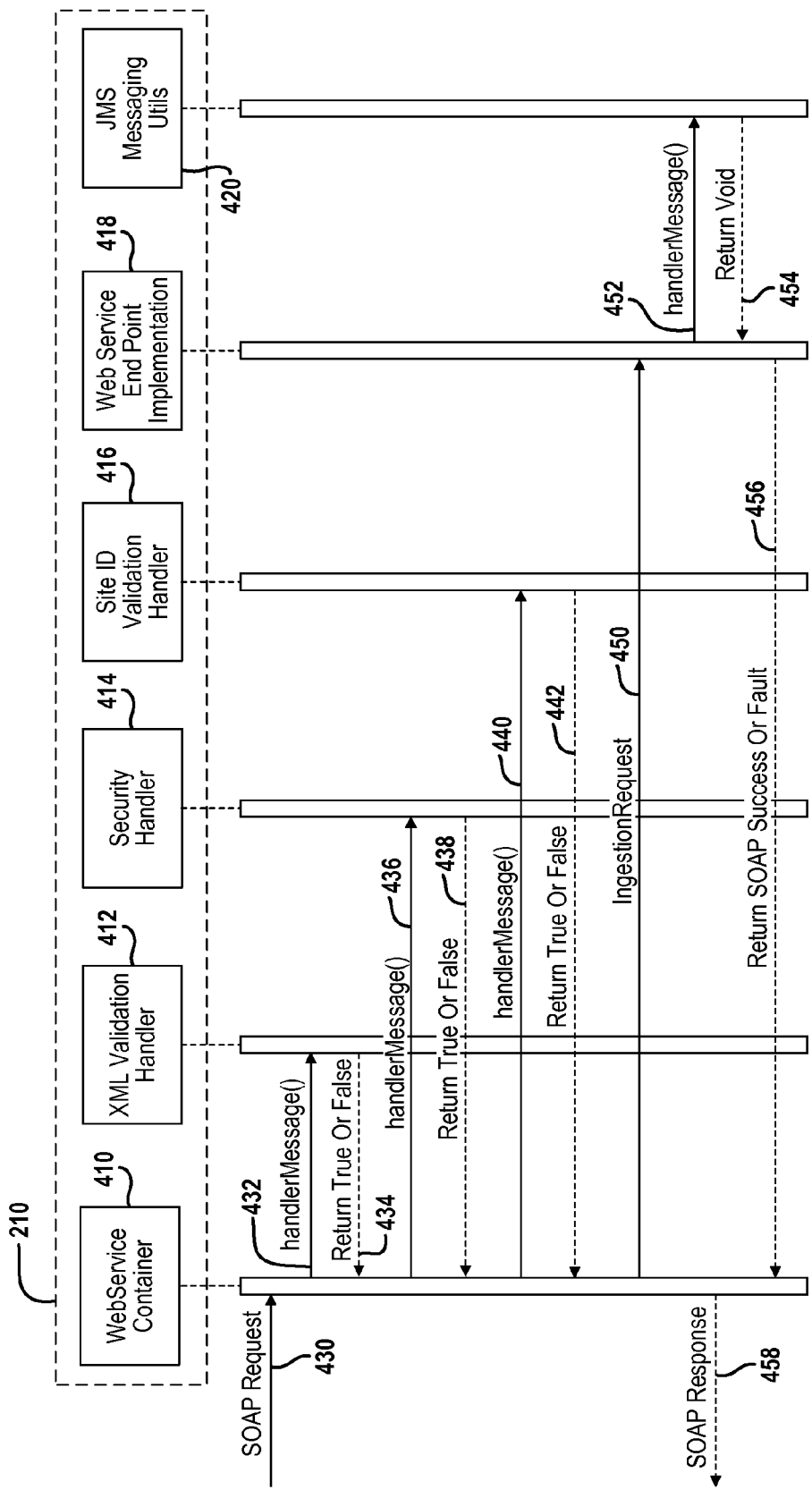
FIG. 7 is a sequence diagram of a method for ingesting schedule data.
Figure 8:
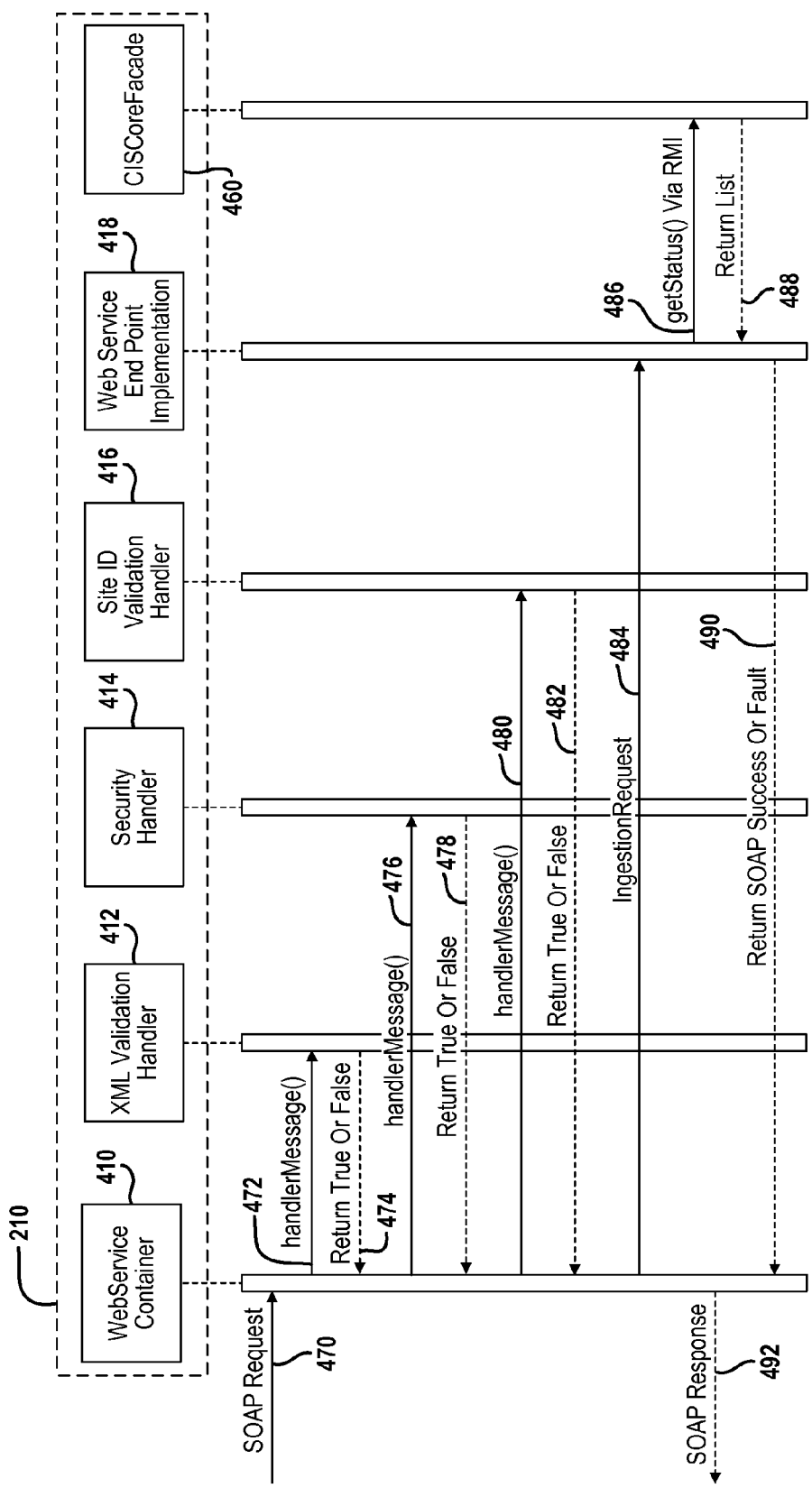
FIG. 8 is a sequence diagram for generating a status of an ingestion process.

Referring now to FIG. 7, a sequence diagram for the system is illustrated. The CIS client may include various modules including a web service container module 410, an XML validation handler module 412, a security handler module 414, a site identifier validation handler module 416, a web service end point implementation module 418, and a JMS messaging utilities module 420.

The web service container module 410 receives the message from the external service provider 80 illustrated in FIG. 1. The XML validation handler 412 is used to validate the incoming message against various schema. The security handler 414 implements a SOAP handler interface. An XML digital signature API may be used to verify the digital signal of the incoming SOAP message. Signature verification may be performed on incoming messages only.

The site identifier validation handler module 416 may validate the site partner. The web service end point implementation module may be implemented using a provider API so that raw XML data may be used rather than a marshaled Java object.

A queue manager 421 may provide the method for sending the messages to the queue. Connection pooling may be used for efficient handling of the queue connections.

In step 430, a SOAP request may be generated at the external service provider and communicated to the CIS client 210. The web service container 410 intercepts the SOAP request and identifies various handlers that may be used to validate the signal. A handler message 432 may be communicated to the XML validation handler module 412. A true or false signal may be returned to the web service container module 410 as signal 434. A second handler message 436 may be communicated to the security handler 414. The security handler 414 may verify the digital signature of the service provider by comparing the digital signature to a stored digital signature. A return signal 438 is generated from the security handler module 414.

A handler message signal 440 may also be communicated to the site ID validation handler 440. In step 442, a return message may be provided to indicate whether or not the site identifier is valid. A true or false signal may be generated as the return signal 442. In step 450, after each of the handlers verifies various portions of the incoming SOAP request 430, an ingestion request may be communicated to the web service end point implementation 418. The web service end point implementation may communicate a message to a queue using JMS messaging utilities 420. If errors occur in communicating the message to the queues, a return void signal 454 may be communicated. A success or fault signal may be communicated as a return SOAP signal from the web service end point implementation module 418 to the web service container module 410. The web service container module 410 may communicate a SOAP request corresponding to the return SOAP success or fault signal 456 using a SOAP response signal 458.

The CIS status may also be generated in the CIS system. The CIS client 210 may provide another web service the status of the ingestion process. The operation may be on the same port as scheduling the ingestion data. The CIS client may have the similar module described above in FIG. 7, but also include a CIS core façade 460.

A SOAP request 470 may be communicated from an external source such as the external service provider. The SOAP request may also process handler messages and return messages from the validation handler. A security handler may also receive a handler message 476 and a return message 478 in a similar manner to signals 436 and 438 above. The site ID validation handler 416 may also receive a handler message 480 and a return message 482 in a similar manner to signals 440 and 442. An ingestion request 484 may also be communicated to the web service end point implementation module 418. The ingestion request 484 may correspond to a status signal. The end point implementation module may thus generate a status request signal 486 and communicate it to the CIS core façade 460. A return signal 488 may return a list as to the status of the results. The status may be communicated to the end point implementation 418 which generates a return SOAP signal 490 to the web service container. The web service container may communicate a web response 492 to the external device requesting the status.

Figure 9:
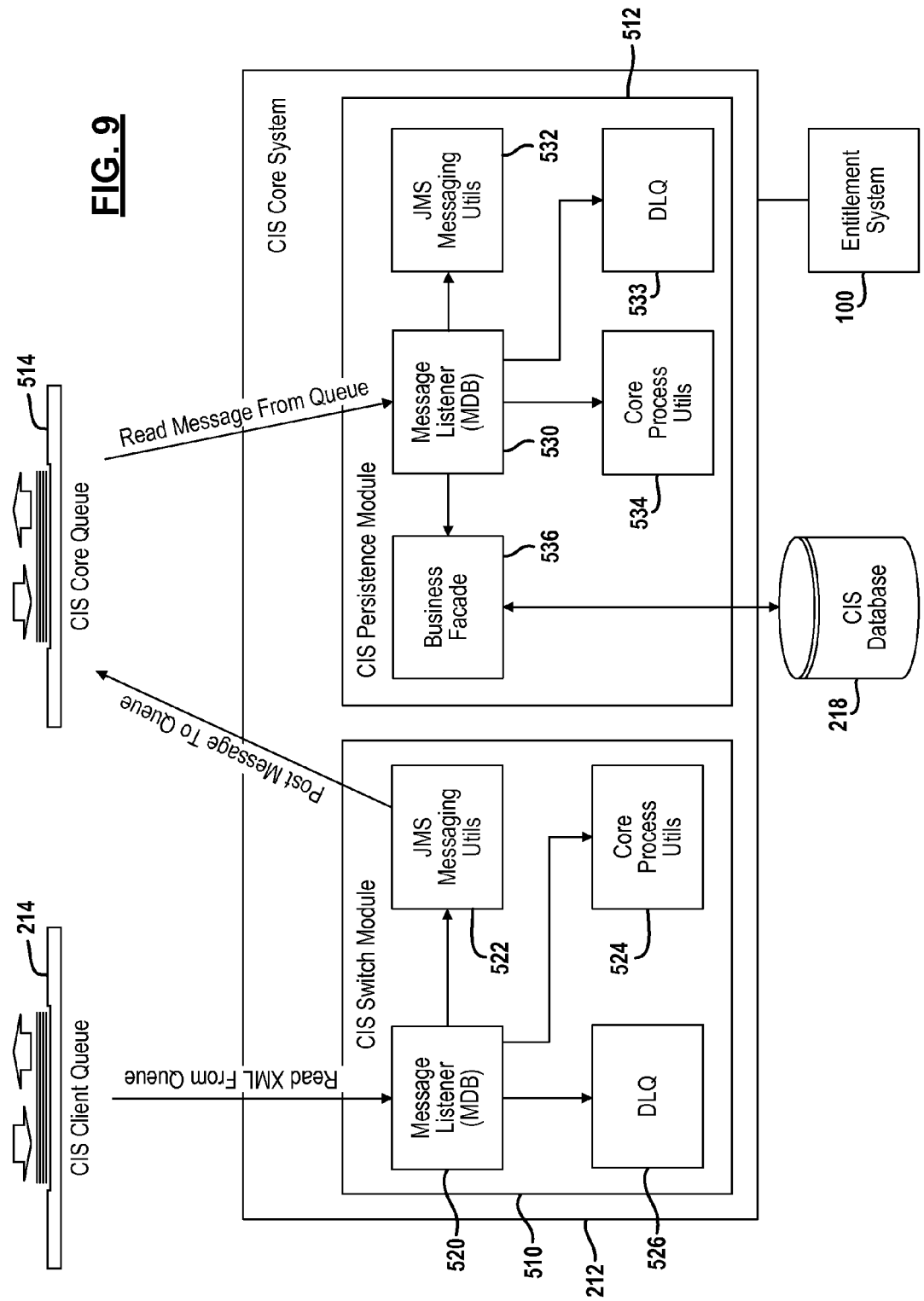
FIG. 9 is a block diagrammatic view of the CIS core system.

Referring now to FIG. 9, the CIS core system 212 is illustrated in further detail. The CIS core system 212 is in communication with the CIS client 210 of FIG. 2 through the CIS client queue 214. XML or other format contents and requests (such as a status request) are read from the client queue and provided to the CIS core system 212. The CIS core system may include a CIS switch module 510 and a CIS persistence module 512. The CIS switch module is in communication with a CIS core queue 514. The CIS core queue receives messages from the CIS switch module which posts the messages to the CIS core queue. The CIS core queue 514 provides messages from the core queue to the CIS persistence module 512 when read by the persistence module 512.

The CIS switch 510 may include a message listener 520 that is in communication with the CIS client queue 214. The message listener 520 may also be in communication with a JMS messaging utility 522 that is in communication with the CIS core queue 514. A core processing utility module 524 may be in communication with the message listener 520. The message listener module 520 may also be in communication with a dead letter queue (DLQ) 526.

The CIS persistence module 512 may include a message listener module 530, which is in communication with a JMS messaging utility module 532. The message listener module 530 may also be in communication with a core processing utility module 534 and a business façade 536. The business façade 536 is in communication with the CIS database 218. The business façade reads, saves and updates information in the CIS database 218.

Generally, the CIS switch 510 breaks the XML messages into small batches of objects and the CIS persistence module 512 stores the batch of objects into the database 218. The CIS persistence module 512 also creates CIS delta files that correspond to the change in the scheduling data received from the external service provider.

The dead letter queues 526 and 533 in each of the switch and persistence modules 510 and 512, respectively will have messages delivered from the queue until it is processed successfully. If the message is corrupted, resources may be wasted or an infinite loop may be generated. The dead letter queue is utilized once a retry count is reached. The message is pushed into the dead letter queue so an infinite loop cannot happen after a predetermined retry count.

The CIS core queue 512 does not know how large the XML file is. When the XML file is sequentially processed and inserted into the database, the whole data will be rolled back if an error occurs. To avoid this situation, the CIS switch module 510 breaks the data file in the XML format into a batch of objects. Once a batch size is reached, the CIS switch module places the batch into the core queue so that thereafter, it is inserted into the CIS database.

Figure 10:
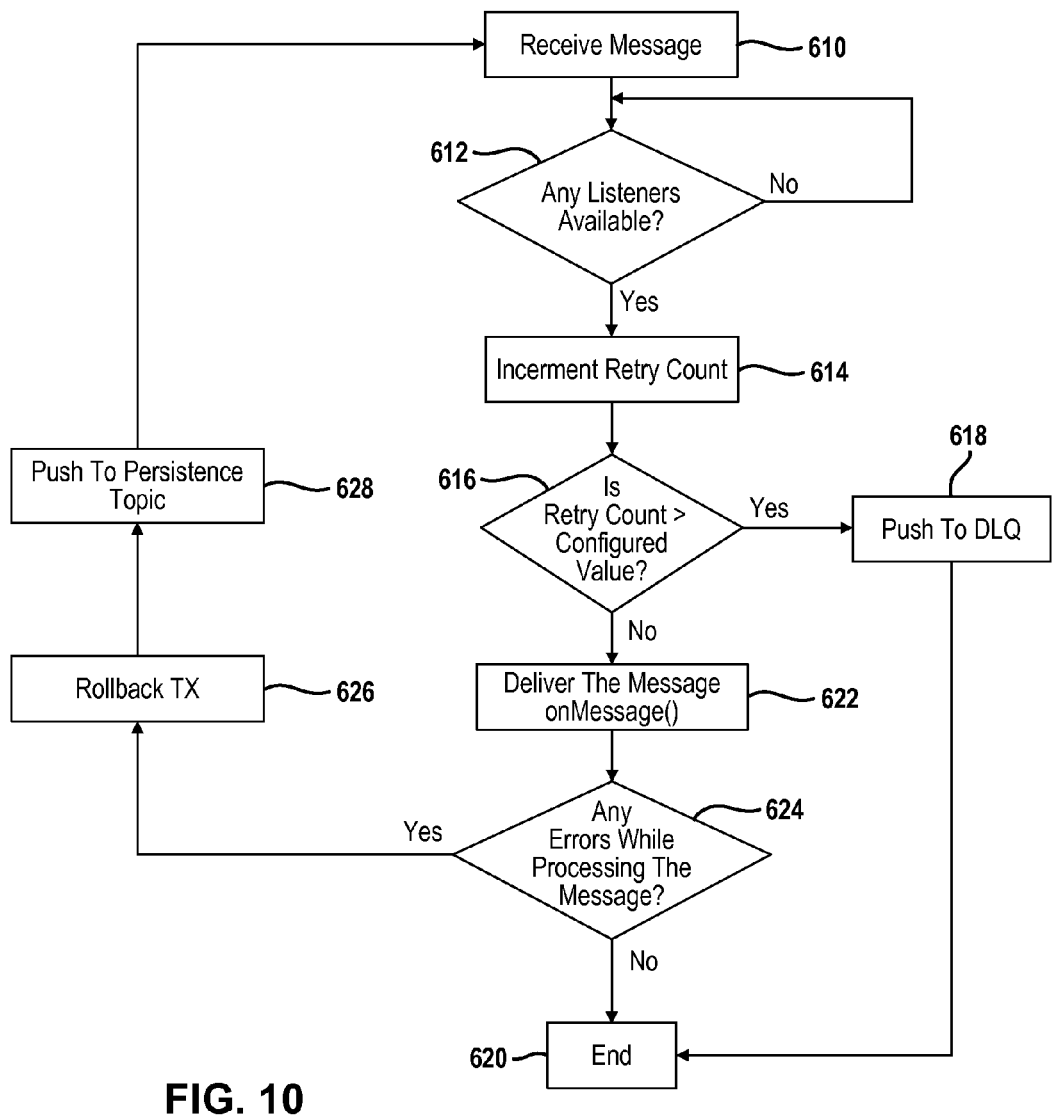
FIG. 10 is a flowchart of a method for processing messages.

Referring now to FIG. 10, a method for operating the CIS core system is set forth. In step 610, a message is received at the client queue. In step 612, if any listeners are not available, then step 612 is again repeated. In step 612, if listeners are available, step 614 is performed. In step 614, a retry counter is incremented. In step 616 the retry count and a configured value are compared. When the retry count is more than a configured value, the message is pushed to the dead letter queue 618. The system then ends in 620.

Referring back to step 616, when the retry count is greater than a configured value, then the message is delivered to the CIS core queue 514 of FIG. 9 in step 622.

After step 622, step 624 determines whether errors have occurred while processing the message. If errors have not occurred while processing, step 620 ends the process.

In step 624, if errors are present during processing, step 626 rolls back the message so that it is placed within the persistence core queue 514 in step 628. The process then starts again in step 610. By placing the data back in the queue another attempt at processing the data may be performed.

Figure 11:
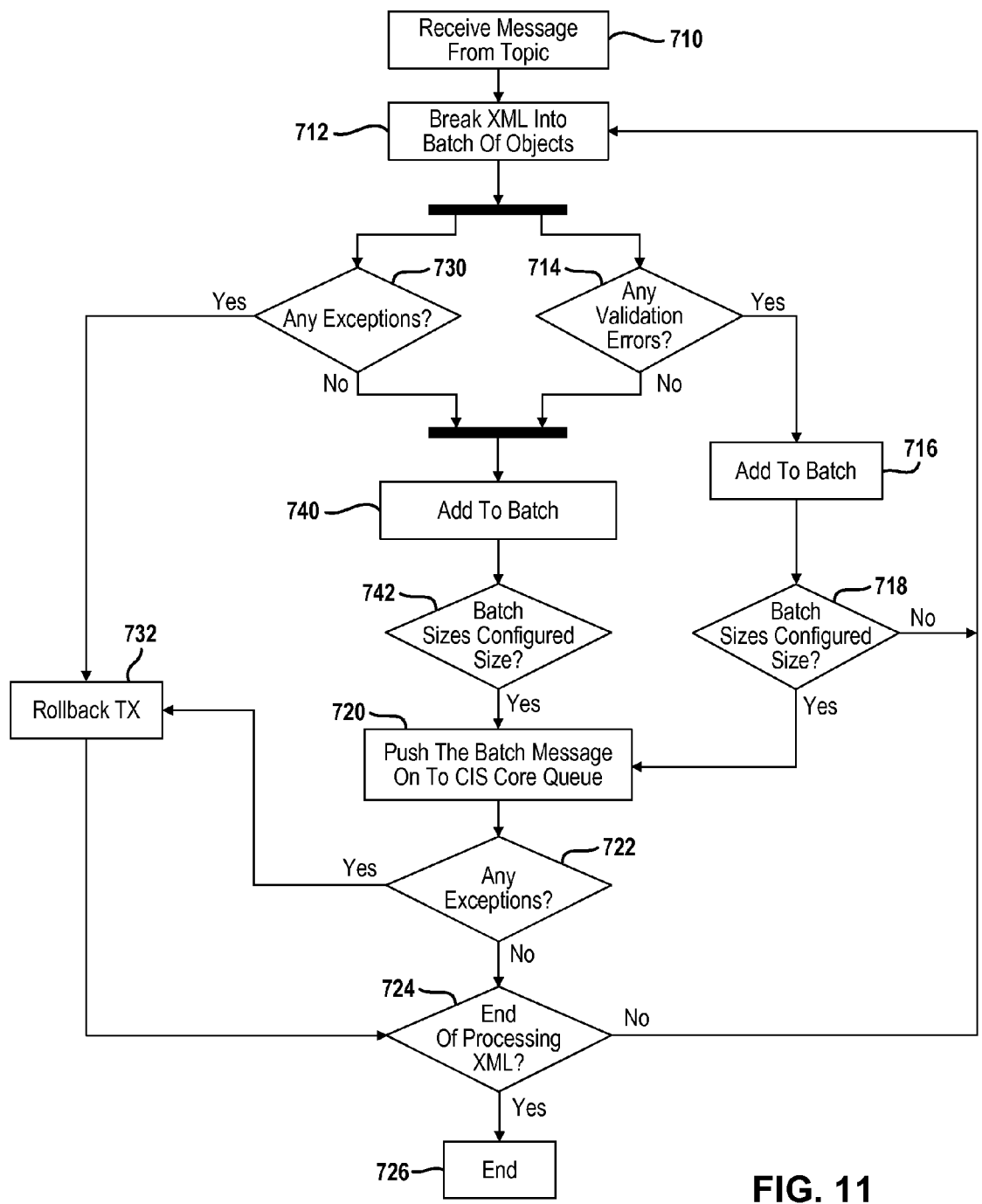
FIG. 11 is a flowchart of a method for operating the CIS core system.

Referring now to FIG. 11, a method of operating the core system is set forth. In step 710, messages are received at the CIS client queue 214. The CIS switch module 510 illustrated in FIG. 9 breaks the messages into a batch of objects in step 712. When there are no validation errors as determined in step 714, step 716 adds the object to the batch. In step 718 when the batch is not the configured size, step 712 is again executed. In step 718 when the batch is the configured size, the batch is pushed to the CIS core queue 514 in step 720. After step 720, step 722 determines if there are any exceptions. If there are no exceptions, step 724 ends the processing of the XML system. The process is then ended in step 726.

Referring back to step 712, after step 712 if there are any exceptions in step 730, the system rolls back the transaction. In step 732 by rolling back the process the current message will go back to the CIS client queue 214 illustrated in FIG. 9. The process will end in step 726 after step 732.

Referring back to step 730 and 714, if there are no exceptions and no validation errors, step 740 adds the message to the batch. When the batch size is equal to the configured size in step 742, the batch message is pushed onto the CIS core queue 514 in step 744. After step 744, it is determined whether there are any exceptions and step 732 is again repeated if there are exceptions and step 724 is repeated if there are no exceptions.

Figure 12:
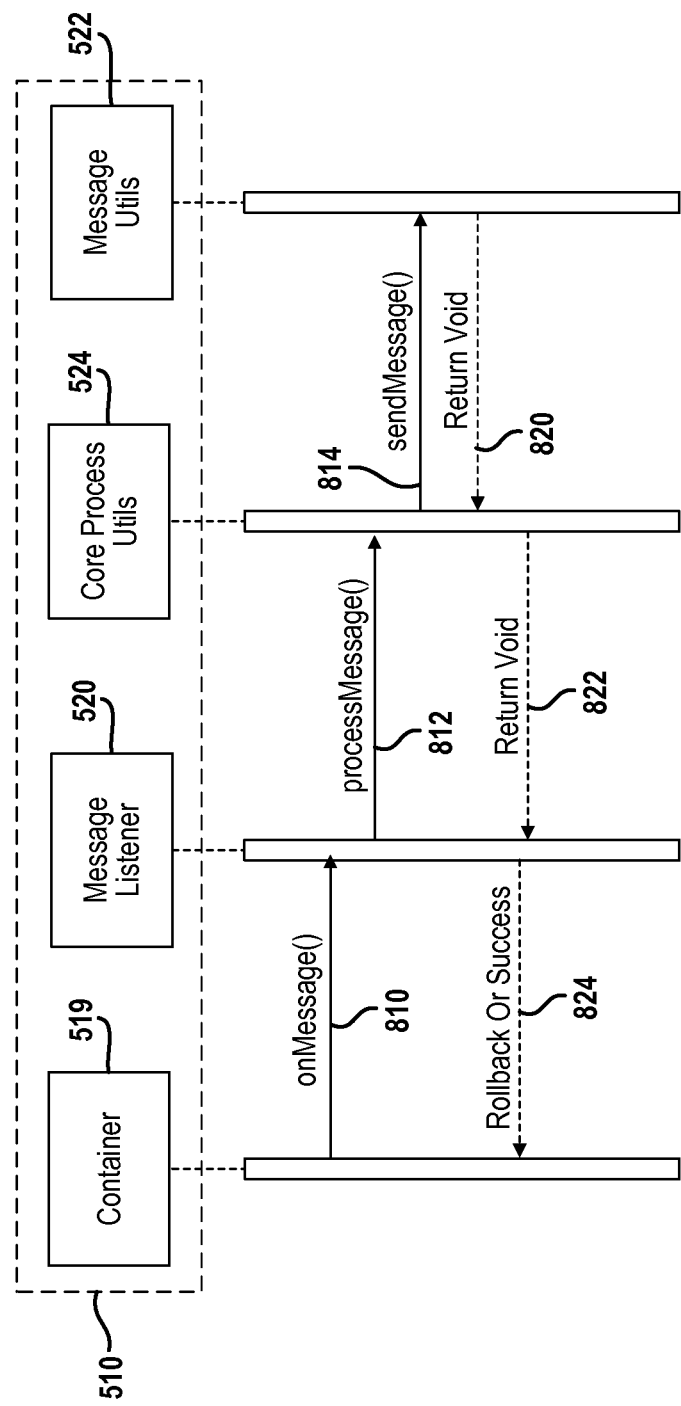
FIG. 12 is a sequence diagram of a method for operating the core system.

Referring now to FIG. 12, a sequence diagram of the process is set forth using the client queue 214 and core queue 514 together with the CIS core system 212.

The operation of the CIS switch module 510 is illustrated in further detail. The on message signal 810 will participate in the transaction. The transaction is a single transaction that is used to read XML from the CIS client queue 214. The message listener 510 generates a process message signal 512 which is communicated to the core process utility. The core process utility 524 then sends the message to the message utilities using a send message signal. The message listener may be a message-driven bean from the EJB standard. The core process utilities 524 may be a regular Java Object which utilizes a JAXB API to convert the XML objects into Java objects and process it as described above. The message utility 512 includes methods to send the batch message to the CIS core queue 514. A JMS API may be used to obtain the connection to the queue. Connection pooling may be used for efficient handling of the queue connections. Connection pooling may be implemented using JBoss JMS connection pooling. After the send message command 814 is communicated from the core process utilities 524 to the message utility 522, the message or the object may be sent to the core queue 514. If an error occurs at sending the message to the core queue 514, a return void signal 820 is returned to the core process utility indicative of the error. If there is an error at the core process utilities 514, a return void signal may also be returned in using the return signal 822. The message may be rolled back in step 824 if the error or if the message was not communicated to the core queue 514. A rollback or success message 824 may be communicated back to the container 519 when success or a rollback is desired.

Figure 13:
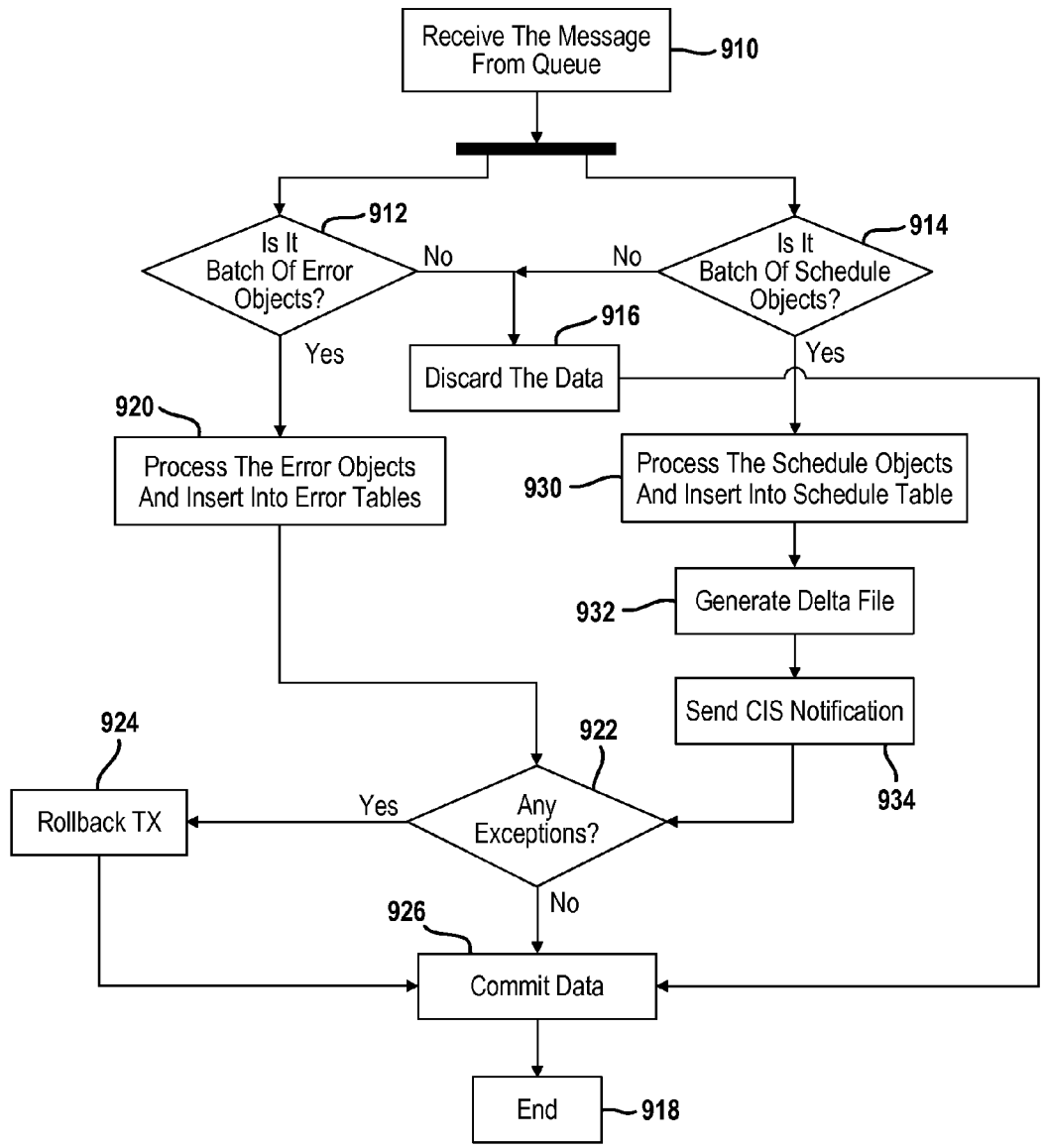
FIG. 13 is a flowchart of a method for committing data in the CIS core system.

Referring now to FIG. 13, the operation of the CIS persistence module 512 is set forth. The persistence module 512 is responsible for pushing the schedule and error data into the database 218 illustrated in FIG. 9. In general, the CIS persistence module 512 reads the batch objects from the CIS core queue and processes the batch objects and stores them within the database 218 of FIG. 9.

In step 910, the batch objects are read from the CIS core queue 514 illustrated in FIG. 9. Steps 912 and 914 determine whether the message is a batch of error objects or a batch of schedule objects. If the message is not a batch of error objects or a batch of schedule objects, step 916 discards the data and the system ends in step 918.

Referring back to step 912, if the message is a batch of error objects, the error objects are processed and inserted into an error table in step 920. After step 920, it is determined whether there are any exceptions. If there are any exceptions, step 924 rolls back the transaction and step 918 is again performed which ends the process. In step 922, if there are no exceptions the data is committed into the error table.

Referring back to step 914, if the message is a batch of schedule objects, step 930 processes the schedule objects and inserts the schedules into a schedule table. The schedule data is inserted or updated if the schedule already exists into corresponding tables. A delta file is generated in step 932 that corresponds to the change in the schedule table. Step 934 sends a CIS notification. The notification contains a list of content identifiers that were just inserted or updated. After step 934, steps 922-926 are performed as above. If any exceptions are present, step 924 rolls back the transaction. If no exceptions exist, then the data is committed into the schedule data.

Figure 14:
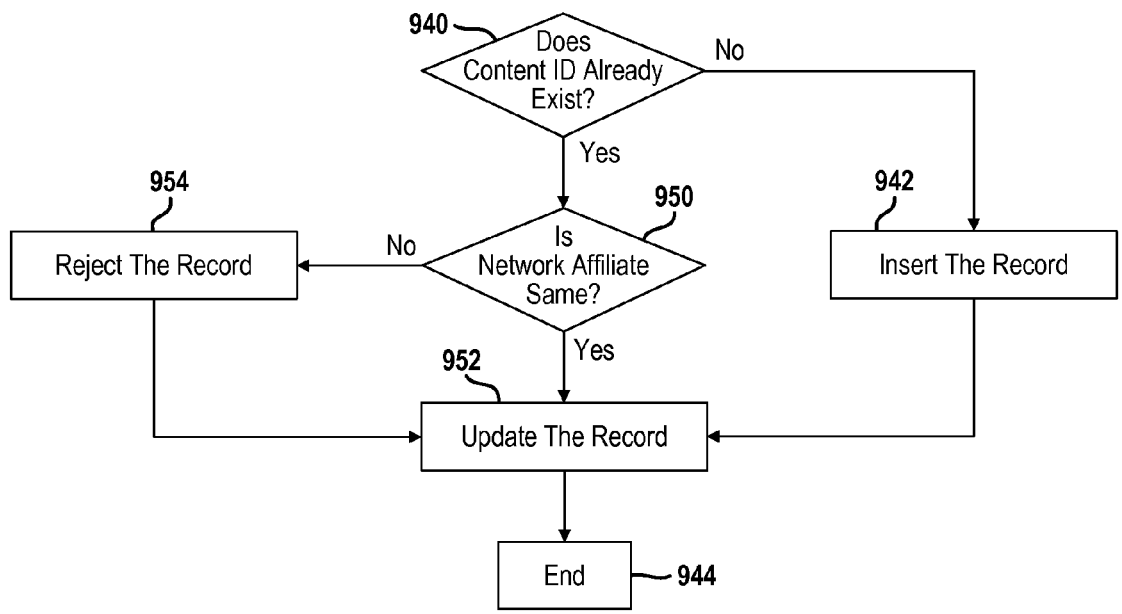
FIG. 14 is a flowchart of a method for updating records within a database.

Referring now to FIG. 14, a method for performing step 930 is set forth. If the content identifier does not exist, the schedule data is inserted into the record in step 942. The system then ends in step 944.

Referring back to step 940, if the content does already exist, step 950 is performed. In step 950, if the network affiliate is the same, the record is updated in step 952. In step 950, if the network affiliate is not the same, the record is rejected in step 954. After steps 954 and 952, step 944 ends the process.

Because the CIS core queue is persistence in nature, the message is redelivered for processing at step 910.

Figure 15:
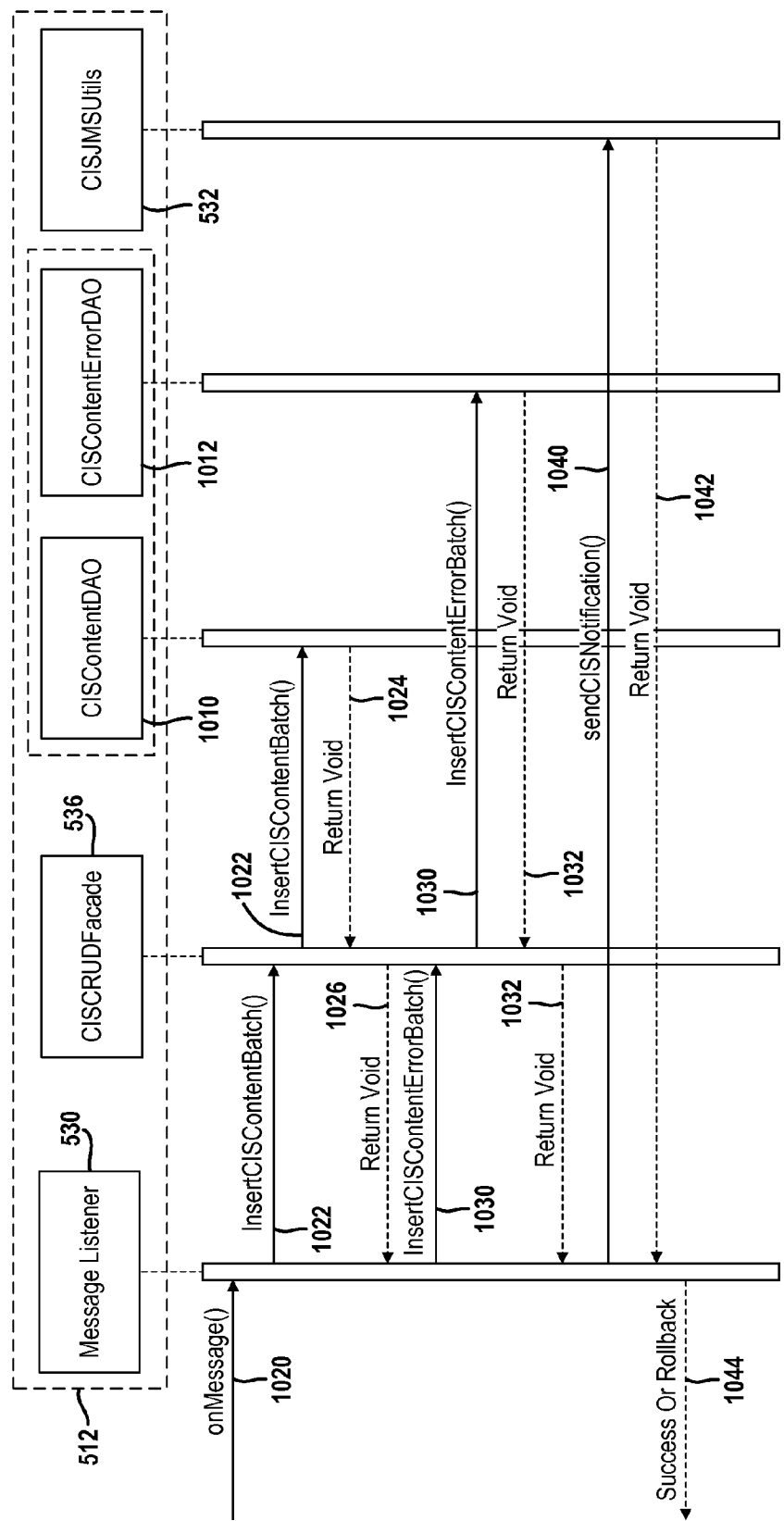
FIG. 15 is a sequence diagram of the method for inserting content into a database.

Referring now to FIG. 15, a method of operating the CIS persistence module 512 is illustrated. The CIS persistence module 512 includes the message listener 530, the business façade 536, and the CIS JMS utilities 532 as illustrated in FIG. 9. The CIS persistence module 512 also includes a CIS content data access object 1010 and a content error data access object 1012. The message listener 530 is or may be a message-driven bean as described above. However, the message listener of the persistence module 512 is the subscriber to the CIS core queue 514. The on message method will participate in a single transaction and when errors occur the transaction will be rolled back. The business façade 536 may include a database controller. The database controller may be a stateless session bean that is used to encapsulate the business methods needed by the application clients and exposed through its remote interface. The data access logic may also be hidden from clients.

The data access object holds the logic to access the database. It may hold a one-to-one relation with the database schema. That is, if there are N tables in the scheme, there will be N data access objects. The implementation details may be hidden from the interface. The transactions may be JTA transactions with container-managed transactions. The database connections may be obtained using a data source configuration.

With respect to the operation, an on listener message 1020 is communicated to the message listener module 530. The message listener module generates an insert CIS content batch signal 1022 and communicates it to the business façade 536. The business façade forward the insert CIS content batch signal 1022 to a CIS content data access object. If an error occurs, a void signal 1024 is returned to the business façade 536 which in turn communicates the return or void signal 1026 to the message listener 530. The object may then be inserted into the schedule table. Signal 1030 is an insert CIS content error batch signal. The error batch signal is used for communicating error objects to the system. The error batch signal 1036 is communicated to the business façade 536. The business façade communicates the error batch signal 1030 to the error data access object. The error data access object receives the signal rather than the content data access object. If an error occurs in the content error batch, a return void signal 1032 is communicated to the business façade 536 and to the message listener 530.

The message listener 530 may also generate a send CIS notification signal 1040 to the JMS utility 532. If an error occurs in this process, a return void signal 1042 may be communicated from the JMS utility to the message listener 530. A success or rollback signal 1044 may be generated at the message listener 530 in response to the send CIS notification signal 1040 or the return or void signal 1042.

Figure 16:
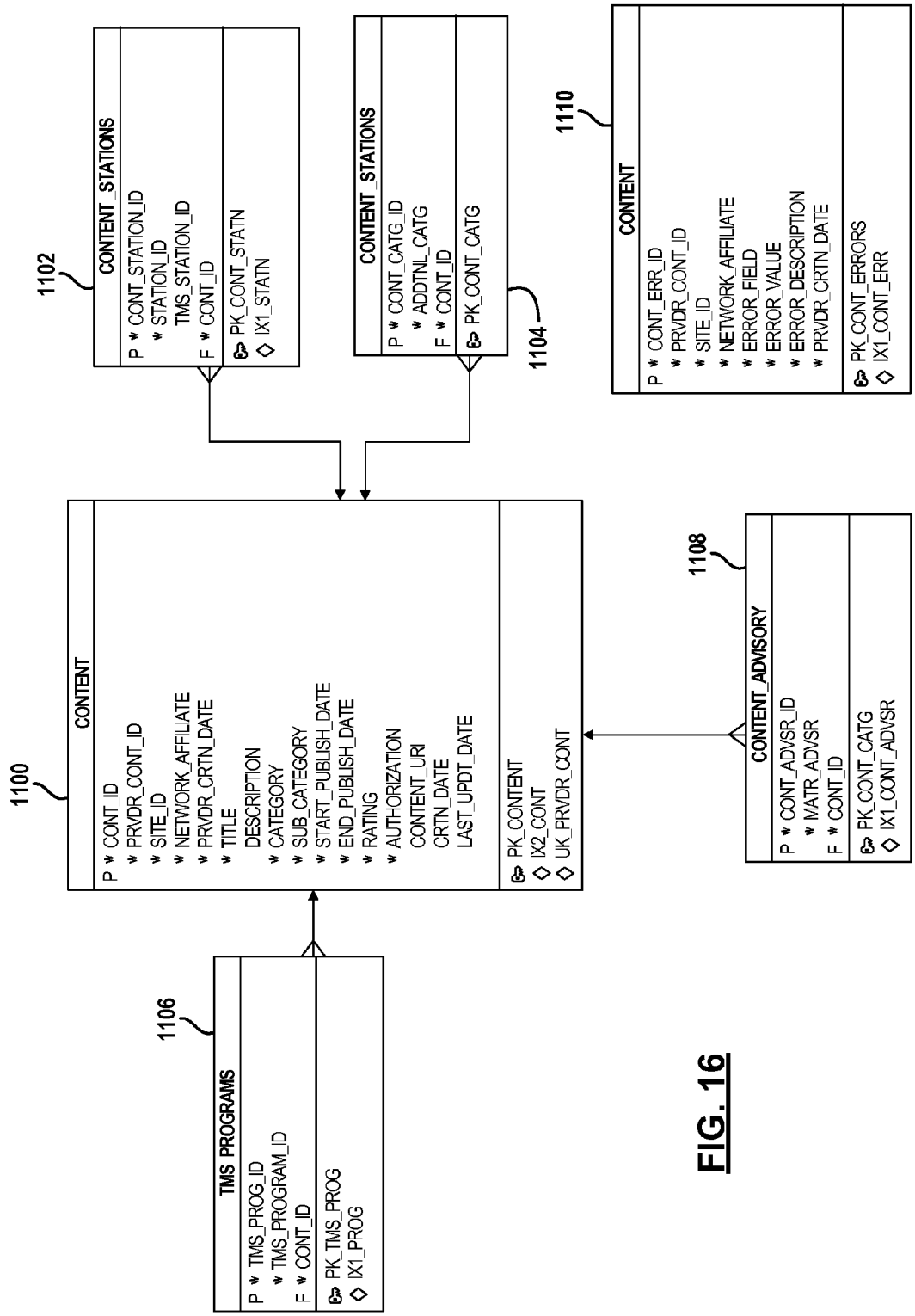
FIG. 16 is a block diagrammatic view of a data model for the content ingestion system.

Referring now to FIG. 16, a data model is illustrated for the schedule data that may be provided by the system. The content data box 1100 may include various types of content data but is not limited to a content identifier, a provider content identifier, a site identifier, a network affiliate identifier, a provider creation date, a title, a description, a subcategory, a category, a start publishing date, an end publishing date, a rating, an authorization, a content URL, a creation date, a last update date, and a key. The content block 1100 may have variable size data fields or fixed data fields. A content station block illustrates various content station variables including a content station ID, a station identifier, a TMS identifier, a content identifier, a content station key and the like.

A content category box 1104 may include the content catalog identifier, additional catalog information, a content identifier and a key. The content categories 1104 may be included within or communicated to the content block 1100. An external data program source may be used to provide external data program data 1106 which may include an external data program identifier, a program, a program identifier or a content identifier. One suitable source for external data content is a Tribune Media Services content block. In addition, the external program source 1106 may obtain a Tribune Media Services key.

A content advisory block 1108 may also generate content advisory data. The content advisory data may include a content advisory identifier, a mature advisory, a content identifier and a content identifier key. Various content errors may be identified by a content error block 1110. The content error block may include a content error identifier, a provider content identifier, a site identifier, a network affiliate identifier, an error field identifier, an error value identifier, an error description identifier, and a provider creation date. Content errors may also be provided by the content error block.

The different types of data in FIG. 15 may be formatted into various sizes including variable sized fields. Timestamps may be used where appropriate. Some fields may be numerical or alphanumerical.

Figure 17:
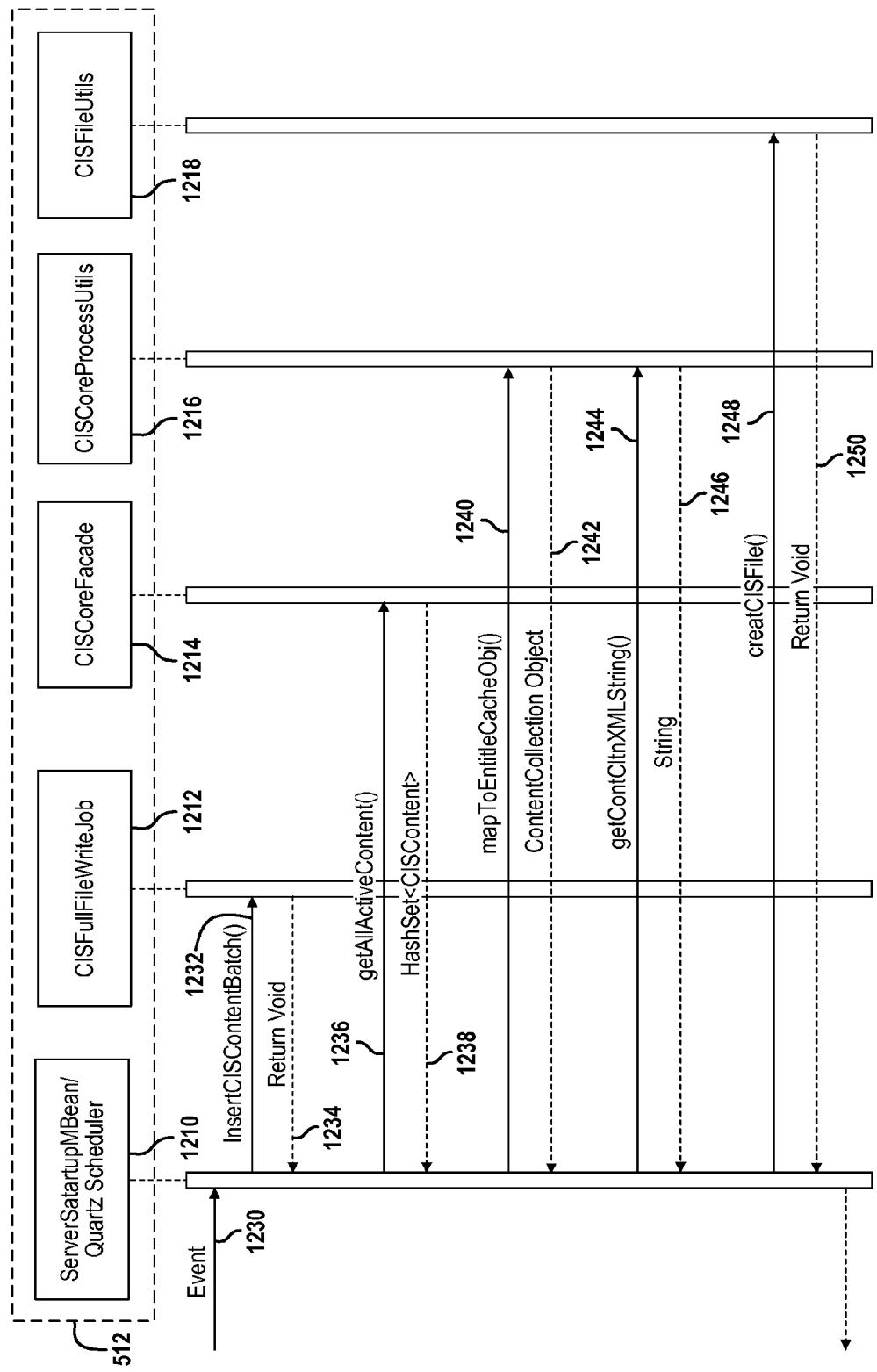
FIG. 17 is a sequence diagram for creating full file data for the content ingestion system.

Referring now to FIG. 17, the CIS core system 212 and, more specifically, the CIS persistence module 512 may be used for communicating data to the entitlement system 100 illustrated in FIGS. 1 and 9. The files generated in the persistence module may be automatically communicated to the entitlement system 100. The CIS persistence module 512 may include additional modules other than that illustrated in FIG. 9. The CIS full file and CIS delta file, as well as checksum files may be stored within the database 218 of FIG. 9 and communicated to the entitlement system 100. The CIS persistence module 512 may create a full file on every server restart and every day at a predetermined time. The sequence diagram of FIG. 17 illustrates the process for creating a full file.

The CIS persistence module 512 may include a server startup/quartz scheduler module 1210 that is responsible for invoking the full file write job on server startup. The module 1210 may be implemented using a JBoss Mbean startup implementation. A quartz scheduler is responsible for invoking the job at a specific time according to a predetermined configuration. A full file write job module 1212 may be a Java object that implements the job interface of the quartz scheduler. The execute method provides the functionality to create the full file when executed at the specific time as configured.

A core façade 1214 uses container-managed transactions to provide the business functions required by the various clients.

A core processing utility 1216 is used to support the core processing of the CIS system.

The file utilities module 1218 is used to help the CIS core to create and manipulate files.

An event signal 1230 is received at the module 1210. The module 1210 then executes or generates an execute signal 1232 which is communicated to the full file write job 1212. If an error occurs, a return void signal 1234 may be communicated back to the module 1210. The module 1210 may also generate an all active content signal 1236 which is communicated to the core façade 1214. A hash set signal 1238 that includes the CIS content may be received back from the core façade to the module 1210.

The module 1210 may also create an entitlement cache object signal 1240. The entitlement cache object signal 1240 may be communicated to the core processing utility 1216. A content collection object 1242 may be communicated under the control of the core processing utility 1216 back to the module 1210.

The module 1210 may also generate a content collection XML string signal 1244 for retrieving the content collection string based on control of the core processing utility. A string signal 1246 may communicate the string back to the module 1210.

The module 1210 may also generate a create CIS file string or signal 1248 which is communicated to the file utility module 1218. The file utility module 1218 may generate a return void signal 1250 if errors occur.

Figure 18:
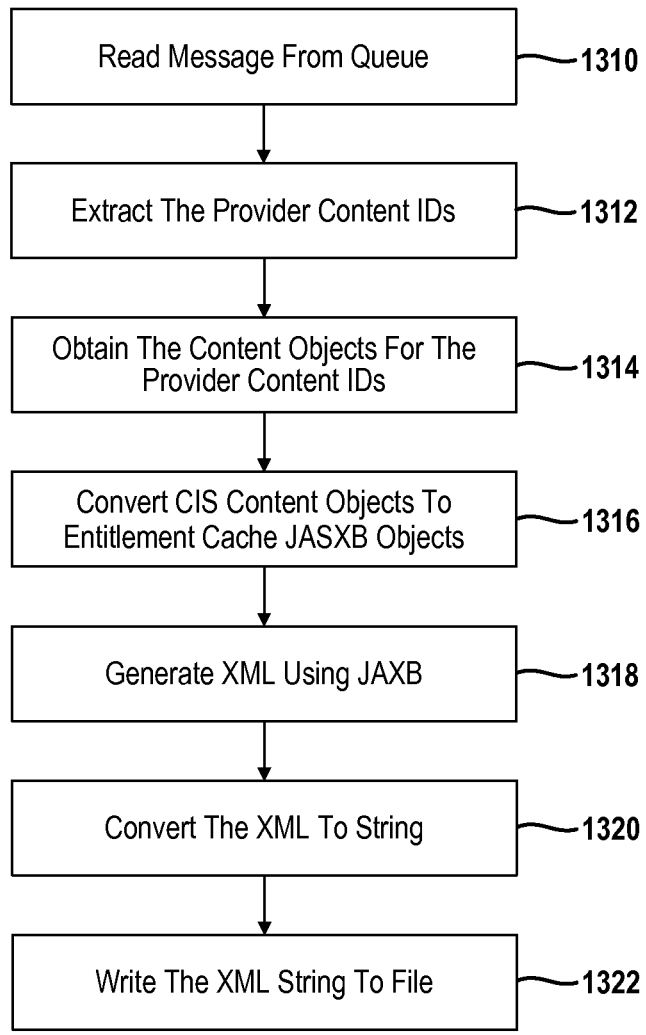
FIG. 18 is a flowchart of a method for creating data for the entitlement system.

Referring now to FIG. 18, the CIS core system 212 notifies the entitlement cache that updated or new records have been inserted as part of partner content ingestion. In step 1310, a message is read from the queue. In step 1312, the provider content identifiers are extracted from the message.

In step 1314, the content objects for the providers are obtained. In step 1316, the CIS content objects are converted to entitlement cache objects. The entitlement cache objects may be JAXB objects.

The objects may be converted to XML using JAXB in step 1318. The XML may be converted to strings in step 1320. In step 1322, the XML string is written to a file. It should be noted that XML is an example of a suitable format for the signals. Other formats may be used.

Figure 19:
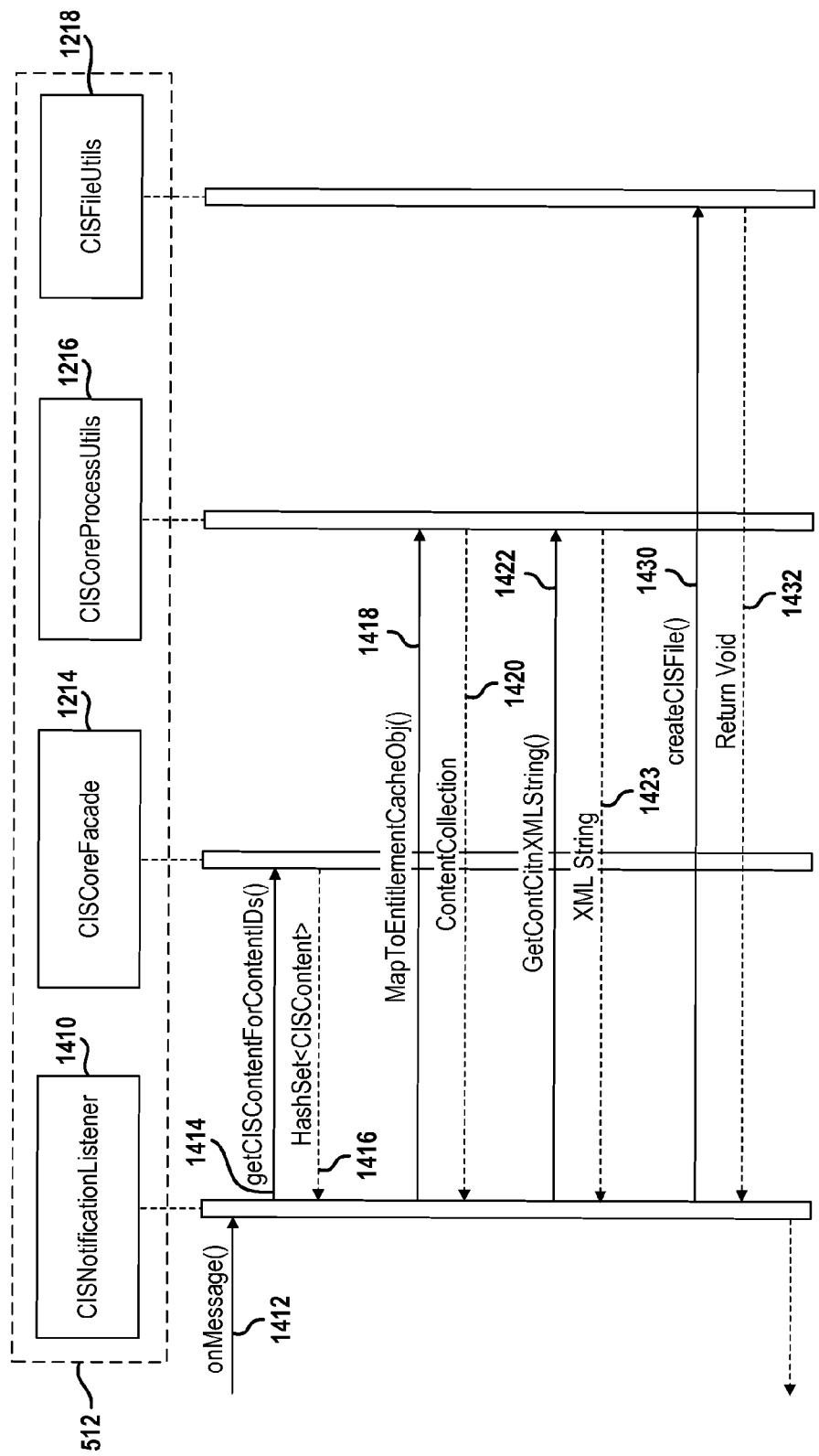
FIG. 19 is a sequence diagram of a method for generating data for the entitlement system.

Referring now to FIG. 19, a sequence diagram for the process in FIG. 18 is set forth.

The CIS persistence module 512 includes the core façade 1214, the core processing utilities 1216 and the CIS file utilities 1218 as described in FIG. 17. The CIS core system 512 may also include a CIS notifications listener module 1410.

In step 1412, an on message signal is received at the notifications listener module 1410. The on message signal 1412 initiates a content for content identifier signal from the notifications listener module 1410. The content for content identifier signal 1414 is communicated to the core façade module 1214. The CIS content may be returned in a hash set signal 1416 to the notifications listener module 1410.

A map to entitlement cache object signal 1418 may be communicated to the core processing utilities module 1218. The content collection signal 1420 may be communicated from the core processing utilities module 1216 to the notifications module 1420.

The notifications listener module 1410 may also generate a content collection XML string 1422. An XML string signal 1423 containing an XML string may be communicated from the core processing utility module 1216 to the notifications listener module 1210.

A create CIS file signal 1430 may be communicated from the notifications listener module 1410 to the file utilities module 1218. If an error occurs, a return void signal 1432 may be communicated from the file utilities module to the notifications listener module.

Figure 20:
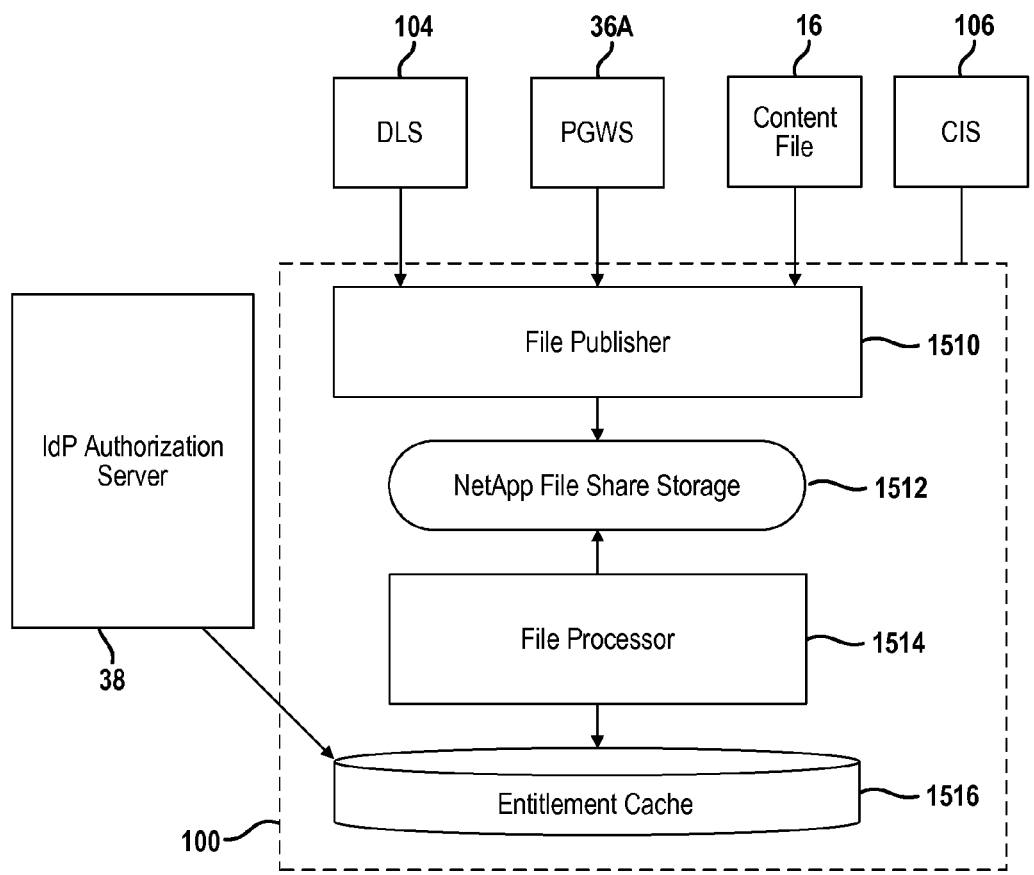
FIG. 20 is a high-level block diagrammatic view of the entitlement system.

Referring now to FIG. 20, the entitlement system 100 has a file share system that is periodically updated with different contents from the external service provider, the primary service provider and other data sources. The entitlement system pools the files periodically and stores them therein. The data files received include schedule data for the content. The files received may be full files, delta files or checksum files whose generation was described above.

The entitlement system 100 is in communication with an IdP authorization server 38. The authorization server 38 is used to authorize various user devices to access various content. The authorization server 38 may compare the content that the user device has requested access to and an authorized rights list associated with the user. The authorized rights list may include channels or networks that the user device has access to through subscription level.

The entitlement system 100 may be in communication with the DLS module 104, the PGWS module 36A and the content file module 16. The entitlement system 100 may also be in communication with the CIS module 106. The schedule data may be obtained from one or more of these sources.

The entitlement system includes a file publisher 1510 that gathers the various data from the different source systems. The data may be converted to a format such as XML and communicates the XML file to a net application file share storage module 1512 that stores the files therein. This process may be performed periodically. When new files arrive at the net application file share storage, a file processor 1514 pools the files and pushes the content to the entitlement cache 1516. The entitlement cache 1516 provides data to various systems including the authorization server 38.

It should be noted that the XML files provided in the file share storage may include check sums for verification of the integrity of the file. Prefixes in the XML file may identify the type of file including a delta file, a full up-to-date file and a restart file. The generation of these types of files was described above.

Figure 21:
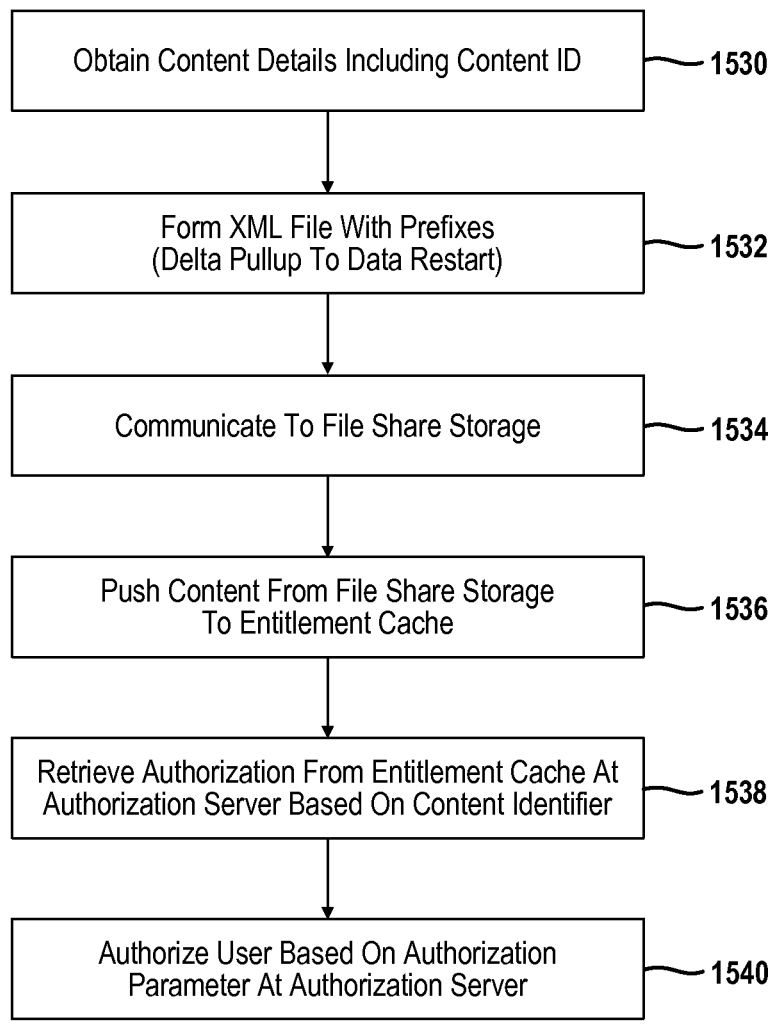
FIG. 21 is a flowchart of a method for operating the entitlement system.

Referring now to FIG. 21, a method for operating the entitlement system is set forth. In step 1530, content details, including but not limited to various content identifiers, network identifiers, category identifiers or other identifiers set forth in FIG. 16, are obtained by the system. In step 1532, an XML is formed with various prefixes that identify the file type. In step 1534, the XML files are communicated to the file share storage. In step 1536, content is pushed from the file share storage to the entitlement cache. This may be performed periodically.

In step 1538, authorization from the entitlement cache is retrieved at the authorization server based on the content identifier, network identifier, or other content details. In step 1540, the user or a user device is authorized based upon the data from the entitlement cache and on an authorization parameter at the authorization server 38 illustrated in FIG. 20. The authorization server 38 may compare an authorized rights list to data from the entitlement cache. In response to comparing the authorized rights list to the data for the content requested, authorization or a denial of authorization may be performed.

Figure 22:
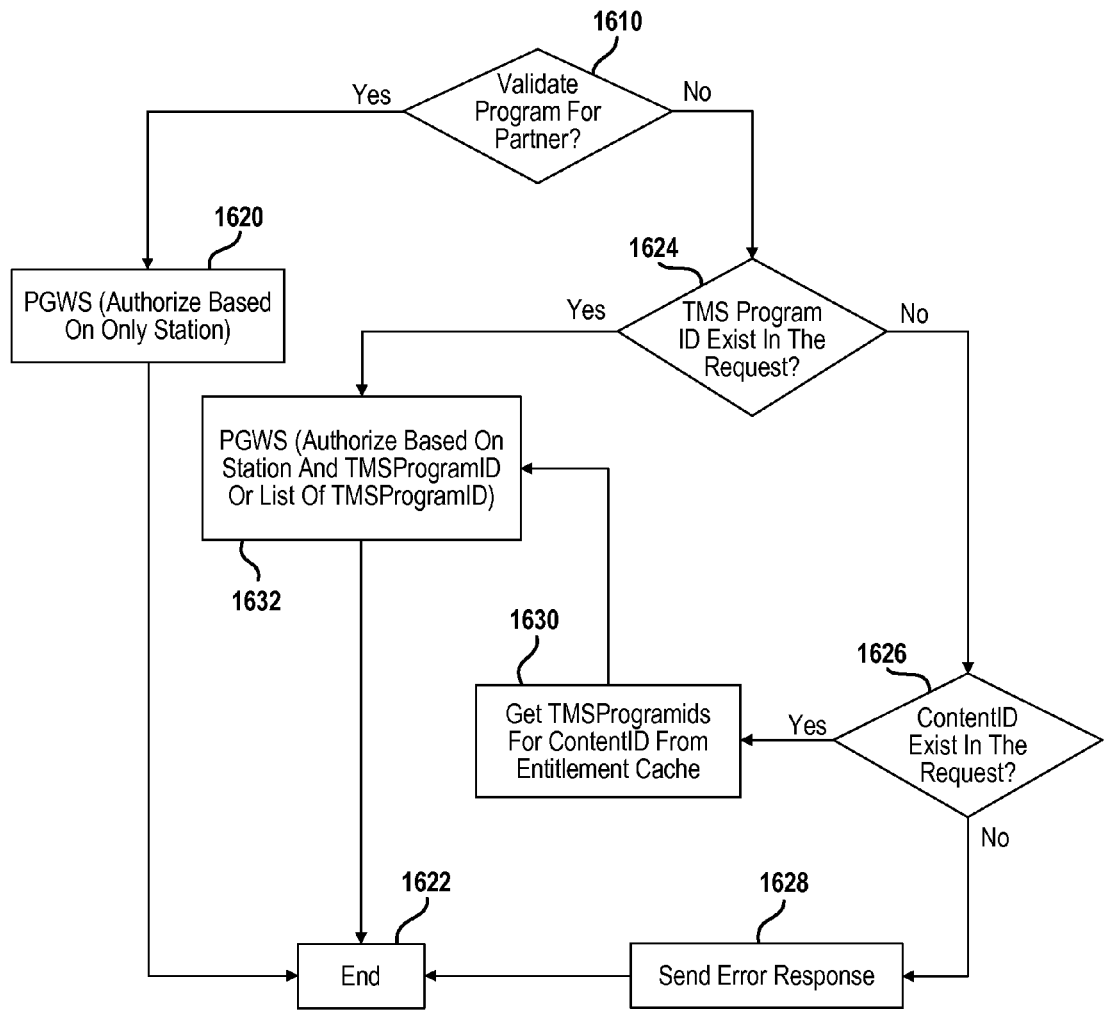
FIG. 22 is a flowchart of a method for operating the entitlement system.

Referring now to FIG. 22, a method for authorization based upon multiple content program IDs is set forth. In step 610, it is determined whether a program identifier validation needs to be performed. If a validation for the partner is to be performed, step 620 uses the program guide web service to authorize based upon a station only. In step 622, the system ends.

Referring back to step 610, if the program is not to be validated for a partner, step 624 is performed. In step 1626, if a content identifier does not exist in the request, step 1628 sends an error response and the system ends in step 622.

Referring back to step 1626, if a content identifier does exist in the request, step 1630 is performed. In step 1630, the external program source such as TMS program identifier for the content identifier is obtained from the entitlement cache. After step 630, step 1632 uses the program guide web service to authorize based upon the station and the TMS program ID or list of program IDs. Step 1632 is also performed after step 1624 if a TMS program identifier exists in the request. After step 1632, step 1622 ends the process.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
communicating schedule data from a second service provider to a content ingestion module of a first service provider;
communicating the schedule data to a first queue of the content ingestion module;
forming a plurality of objects from the schedule data;
communicating the plurality of objects to a second queue of the content ingestion module;
reading the plurality of objects from the second queue; and
storing the plurality of objects in a database.

2. A method as recited in claim 1 further comprising communicating a digital signature with the schedule data from the second service provider, and verifying the digital signature prior to communicating the schedule data to the first queue.

3. A method as recited in claim 1 further comprising communicating a second service provider site identifier for the second service provider with the schedule data, and validating the second service provider site identifier prior to communicating the schedule data to the first queue.

4. A method as recited in claim 1 further comprising determining the second service provider is invalid, and communicating an error signal to the second service provider.

5. A method as recited in claim 1 further comprising validating the schedule data prior to communicating the schedule data to the first queue.

6. A method as recited in claim 1 wherein communicating schedule data comprises communicating a network identifier and a content identifier to the content ingestion system.

7. A method as recited in claim 1 further comprising generating an ingestion status signal.

8. A method as recited in claim 7 wherein the ingestion status signal is generated in response to a status query signal from the second service provider.

9. A method as recited in claim 1 wherein communicating schedule data comprises communicating schedule data in an XML format.

10. A method as recited in claim 1 wherein forming a plurality of objects includes forming a plurality of Java objects.

11. A method as recited in claim 1 further comprising rolling back the plurality of objects to the second queue prior to storing the plurality of objects in a database.

12. A method as recited in claim 1 further comprising, after reading the plurality of objects from the second queue, generating delta files and saving the delta files in the database.

13. A method as recited in claim 1 further comprising restarting a server; and
after restarting the server generating a full file containing active data.

14. A method as recited in claim 1 further comprising at a scheduled time, generating a full file containing active data.

15. A method as recited in claim 1 wherein the scheduled time is daily.

16. A method as recited in claim 1 further comprising creating a checksum file and, storing the checksum file in the database.

17. A method as recited in claim 1 wherein storing the objects comprises storing the objects in a schedule table database.

18. A method as recited in claim 1 further comprising attempting to move objects from the first queue for a predetermined time, and after the predetermined time moving a first object to a dead letter queue.

19. A content ingestion system of a first service provider comprising:
a client module of the content ingestion system receiving schedule data from a second service provider;
a first queue of the content ingestion system receiving the schedule data from the client module;
a switch module forming a plurality of objects from the schedule data;
a second queue of the content ingestion system receiving the plurality of objects from the switch module;
a persistence module of the content ingestion system reading the plurality of objects from the second queue and storing the objects in a database.

20. A content ingestion system as recited in claim 19 wherein the client module receives a digital signature with the schedule data and verifies the digital signature.

21. A content ingestion system as recited in claim 19 wherein the client module receives a site partner identifier with the schedule data, and validates the site partner identifier prior to communicating the schedule data to the first queue.

22. A content ingestion system as recited in claim 19 wherein the client module validates schedule data prior to communicating the schedule data to the first queue.

23. A content ingestion system as recited in claim 19 wherein the schedule data comprises a network identifier and a content identifier.

24. A content ingestion system as recited in claim 19 wherein the first service provider generates an ingestion status signal.

25. A content ingestion system as recited in claim 24 wherein the ingestion status signal is generated in response to a status query signal from the second service provider.

26. A content ingestion system as recited in claim 19 wherein the schedule data comprises an XML format.

27. A content ingestion system as recited in claim 19 wherein the plurality of objects a plurality of Java objects.

28. A content ingestion system as recited in claim 19 wherein the client module determines the external service provider is invalid and, communicates an invalid signal to the second service provider.

29. A content ingestion system as recited in claim 19 wherein the persistence module stores the plurality of objects in the second queue.

30. A content ingestion system as recited in claim 19 wherein the persistence module reads the plurality of objects from the second queue generates delta files and saves the delta files in the database.

31. A content ingestion system as recited in claim 19 wherein the persistence module generates a full file containing active data after restarting.

32. A content ingestion system as recited in claim 19 wherein the persistence module generates a full file containing active data at a scheduled time.

33. A content ingestion system as recited in claim 32 wherein the scheduled time is daily.

34. A content ingestion system as recited in claim 19 wherein the persistence module creates a checksum file and stores the checksum file in the database.

35. A content ingestion system as recited in claim 19 wherein the database comprises a schedule table database.

* * * * *